(12) United States Patent
Sugawara et al.

(10) Patent No.: US 7,386,012 B2
(45) Date of Patent: Jun. 10, 2008

(54) MULTIPLEX TRANSMISSION APPARATUSES, MULTIPLEX TRANSMISSION NETWORKS, AND OPERATION METHOD THEREFOR

(75) Inventors: Toshiki Sugawara, Dallas, TX (US); Masaki Ohira, Yokohama (JP); Yukio Nakano, Richardson, TX (US); Takashi Mori, Yokohama (JP)

(73) Assignee: Hitachi, Ltd. (JP)

( * ) Notice: Subject to any disclaimer, the term of this patent is extended or adjusted under 35 U.S.C. 154(b) by 857 days.

(21) Appl. No.: 10/728,260

(22) Filed: Dec. 3, 2003

(65) Prior Publication Data

US 2004/0165618 A1    Aug. 26, 2004

Related U.S. Application Data

(63) Continuation of application No. 09/731,424, filed on Dec. 6, 2000, now Pat. No. 6,697,386, which is a continuation of application No. 08/863,675, filed on May 27, 1997, now Pat. No. 6,169,754.

(30) Foreign Application Priority Data

May 31, 1996  (JP) .............................. 08-138011

(51) Int. Cl.
*H04J 3/24* (2006.01)
(52) U.S. Cl. ...................... 370/474; 370/535
(58) Field of Classification Search ........ 370/474–476, 370/535–544
See application file for complete search history.

(56) References Cited

U.S. PATENT DOCUMENTS

| | | | |
|---|---|---|---|
| 5,291,486 A * | 3/1994 | Koyanagi .................... | 370/541 |
| 5,402,414 A * | 3/1995 | Asai ........................... | 370/376 |
| 5,623,357 A | 4/1997 | Kight et al. ................. | 359/135 |
| 5,841,760 A | 11/1998 | Martin et al. ............... | 370/242 |
| 5,857,092 A * | 1/1999 | Nakamura et al. .......... | 370/516 |
| 6,094,440 A | 7/2000 | Sugawara et al. .......... | 370/465 |
| 6,118,795 A | 9/2000 | Fukunaga et al. .......... | 370/503 |
| 6,169,754 B1 | 1/2001 | Sugawara et al. .......... | 370/535 |
| 6,188,692 B1 * | 2/2001 | Huscroft et al. ............ | 270/476 |
| 6,314,097 B1 | 11/2001 | Ohara ........................ | 370/392 |

FOREIGN PATENT DOCUMENTS

| | | | |
|---|---|---|---|
| JP | 479628 | 3/1992 | |
| JP | 479629 | 3/1992 | ...................... 3/14 |
| JP | 5114892 | 5/1993 | |
| JP | 758718 | 3/1995 | ...................... 3/14 |

OTHER PUBLICATIONS

Office Action for JP Appl. 2003-074797 dated Sep. 14, 2004.
Office Action for JP Appl. 8-138011 dated Aug. 24, 2004.

\* cited by examiner

*Primary Examiner*—Ricky Q. Ngo
*Assistant Examiner*—Pao Sinkantarakorn
(74) *Attorney, Agent, or Firm*—Sofer & Haroun, LLP

(57) ABSTRACT

An overhead passing processing circuit in a synchronous multiplex network, with a circuit for extracting predetermined administration and maintenance operating information from multiplexed signals, a crossconnecting circuit for crossconnecting information extracted by the extraction circuit stage, and an insertion circuit for inserting an output of the crossconnecting circuit into a predetermined location in the overhead of the multiplexed signal to be transmitted.

15 Claims, 13 Drawing Sheets

FIG.3

| OVERHEAD | | FUNCTION |
|---|---|---|
| SECTION OVERHEAD | A1,2A | FRAME SYNCHRONIZATION |
| | B1 | ADMINISTRATION OF ERRORS IN SECTION INTERVAL |
| | D1~D3 | USED FOR MAINTENANCE OPERATION |
| | E1 | SPEECH COMMUNICATION FOR CRAFT MAN |
| | J0 (C1) | DESIGNATION OF OC-1 MULTIPLEX NUMBER OF OC-M SIGNAL |
| | F1 | USED FOR CONVENIENCE OF CRAFT MAN |
| LINE OVERHEAD | H1,H2 | INDICATION OF HEAD PHASE OF PATH |
| | H3 | USED FOR PREQUENCY SYNCHRONIZATION |
| | B2,M1 | ADMINISTRATION OF ERRORS IN LINE INTERVAL |
| | K1,K2 | SWITCHING CONTROL FOR LINE INTERVAL,TRANSFER OF ALARM |
| | D4~D12 | USED FOR MAINTENANCE OPERATION |
| | E2 | SPEECH COMMUNICATION FOR CRAFT MAN |
| | S1 | USED FOR OPERATION OF NETWORK SYNCHRONIZATION |
| | Z1,Z2 | INTERNATIONALLY RESERVED AS SPARE |

FIG. 7

MULTIPLEX TRANSMISSION APPARATUSES, MULTIPLEX TRANSMISSION NETWORKS, AND OPERATION METHOD THEREFOR

RELATED APPLICATIONS

This application is a continuation application of U.S. patent application Ser. No. 09/731,424, filed on Dec. 6, 2000, now U.S. Pat. No. 6,697,386, which is in turn a continuation of U.S. application No. 08/863,675, filed May 27, 1997, now U.S. Pat. No. 6,169,754, issued on Jan. 1, 2001, the entirety of which are incorporated herein by reference.

BACKGROUND OF THE INVENTION

1. Field of the Invention

The present invention relates to configurations of digital transmission apparatuses and configurations of communication networks using the digital transmission apparatuses, and more particularly to configurations of transmission apparatuses for use in a synchronous digital hierarchy and configurations of communication networks using the multiplex transmission apparatuses.

2. Description of the Related Art

In today's digital transmission networks, the technology of synchronization has been advanced to such a degree that a communication network is synchronized with faster transmission apparatuses employing optical transmission. For functions and configurations of the digital transmission networks and transmission apparatuses, worldwide standards have been established such that a transmission apparatus and/or a communication network may be introduced in conformity to the standards to provide high quality transmission anywhere in the world. Examples of specific standards may include the standard (established in 1988) on a transmission system referred to as "SDH" (Synchronous Digital Hierarchy) defined in Recommendation G. 707 and so on by International Telecommunication Union (hereinafter abbreviated as "ITU-T"), and the standard (established in 1991) on a transmission system referred to as "SONET" (Synchronous Optical Network) defined in Standard T1.105 by American National Standard Institute (hereinafter abbreviated as "ANSI"), both of which define the configuration of optical synchronous communication systems and functions of transmission apparatuses.

Both SDH and SONET define the processing (transmission, multiplexing/demultiplexing, and so on) of a synchronous multiplexed signal (frame) which comprises a main signal portion referred to as a "Payload" in which digitized main signals are multiplexed, and signals referred to as "overheads", added to the payload, for administration and maintenance operations for a transmission apparatus and communication network. The overheads include pointers which are used to perform stuff controls such as frame phase synchronization and frequency adjustment to provide a transmission system which has a less transmission delay and a higher administration and maintenance operation performance than conventional digital synchronous transmission apparatuses. The overheads added to the frame are classified into a section overhead (SOH) and a line overhead (LOH). The section overhead is used for administration and maintenance operations for each transmission span between transmission apparatuses and regenerators (defined as a section), and generated in an apparatus (including a regenerator), transmitted through a transmission span, and terminated at a next apparatus. The line overhead is used for administration and maintenance operations for each transmission interval between transmission apparatuses which process multiplexed main signals (defined as a line). The line overhead is generated in a transmission apparatus, transmitted through transmission spans and regenerators, and terminated at a next multiplexing apparatus. Examples of transmission apparatuses and networks adopting the above-mentioned SDH or SONET are described in JP-A-4-79628 and JP-A-5-114892.

In a transmission network in conformity to SDH or SONET, multiplexers may be occasionally connected to each other on a transmission line through regenerators. For carrying out the administration and maintenance operations between the multiplexers in such a transmission network, the line overhead is used to transmit and receive data and speech signals necessary to the administration and maintenance operations between the multiplexers. For example, D-bytes referred to as "data communication channels" and E-bytes referred to as "orderwires" of the line overhead are used to transmit and receive such data and speech signals between the multiplexers. Specifically, when a multiplexer on the transmission side inserts data and speech information into D4-D12 bytes and E2 byte of a line overhead and transmits the line overhead onto a transmission line, the line overhead is terminated at a destination multiplexer through the transmission line and regenerators, thereby carrying out the administration and maintenance operations between the multiplexers.

As the number of subscribers increases in the transmission network or as an increased amount of signals is communicated through the transmission network, extension and/or modifications in the transmission network, such as installation of additional multiplexers and replacement to the transmission network to a faster transmission line, may be required for supporting the increase in subscribers and the amount of communicated signals. For example, if the amount of communications increases, the existing transmission network is reconfigured, wherein similar multiplexers to those so far used are additionally installed in the transmission network, and a plurality of faster and larger-scaled multiplexers are introduced for processing signals in place of regenerators to modify the transmission network so that the multiplexers are connected through faster transmission line in the transmission network.

However, the reconfiguration of the transmission networks as mentioned above results in a problem involved in SDH and SONET standards. Specifically, since the line overhead is terminated at each transmitter according to SDH and SONET standards, an overhead outputted from an existing multiplexer may be terminated at an additionally installed faster multiplexer, so that the overhead is not transmitted to a far-end multiplexer which has so far received this overhead. In other words, the reconfiguration results in a lack of the administration and maintenance operations previously performed between the multiplexers before the reconfiguration. Thus, while the transmission capability of the transmission network for transmitting main signals is improved by the reconfiguration of the transmission network, the reconfiguration causes changes in the administration and maintenance operation capability of the transmission network, such as lack of the administration and maintenance operations so far performed between transmission apparatuses. Since administration and maintenance operation information previously provided is no longer available to a craft person dedicated to the maintenance of the transmission network, the craft person may suffer from quite inconvenient situations.

SUMMARY OF THE INVENTION

It is an object of the present invention to prevent changes in administration and maintenance operation capability due to a reconfiguration of a transmission network as mentioned above, and specifically to provide a transmission apparatus and a transmission network having an administration and maintenance operation capability which is not affected by any modification to the transmission network or which enable more flexible and high performance administration and maintenance operations in a simple configuration.

More specifically, the present invention provides a transmission apparatus which additionally has a function of passing through an overhead instead of processing the overhead standardized by SDH and SONET. The present invention also provides a transmission network, which is flexible and superior in administration and maintenance operation performance, wherein the transmission network uses transmission apparatuses as mentioned above, such that arbitrary transmission apparatuses in the transmission network are permitted to transmit and receive an arbitrary overhead therebetween. The present invention also provides a method of operating the configuration for the transmission network.

In a more detailed aspect, the present invention provides circuits and apparatus for use in a digital transmission apparatus, in a simple structure, for selectively cross-connecting a received tributary overhead and transmitting the cross-connected overhead to a far-end transmission apparatus. The present invention also allows for a tributary overhead containing information which cannot be interpreted at a far-end destination apparatus simply by passing the overhead through intervening apparatuses, and provides circuits and apparatus, in a simple structure, for converting a tributary overhead into information usable by a far-end destination apparatus and for transmitting the converted information to the far-end destination apparatus. In particular, the present invention provides simple circuits and apparatus for accurately notifying the number of transmission errors, if any, in a tributary through which an overhead is transmitted and received, to enable the management of transmission quality.

Moreover, the present invention provides a method of selectively cross-connecting an overhead and transmitting and receiving the cross-connected overhead between selected multiplexers, and a method of detecting and notifying transmission errors which have occurred in a tributary.

To solve the problems mentioned above, a multiplex transmission apparatus according to the present invention receives a multiplexed tributary signal comprising a payload having a plurality of main signals multiplexed therein and overhead bytes including a plurality of maintenance information associated with administration and maintenance operations, performs termination processing for the administration and maintenance operation information and transmission processing for the payload, thereafter converts the multiplexed tributary signal into a multiplexed high-speed signal comprising a payload including main signals which have been processed for transmission and a plurality of administration and maintenance operation information, and transmits the multiplexed high-speed signal. The multiplex transmission apparatus comprises a circuit or a apparatus for selecting predetermined maintenance information from the plurality of maintenance information included in the received multiplexed tributary signal, and inserting the predetermined maintenance information into an overhead byte in the multiplexed high-speed signal on the high-speed transmission side to thereby pass the predetermined maintenance information through the multiplex transmission apparatus.

Specifically, the multiplex transmission apparatus comprises an overhead passing circuit or a passing apparatus for passing maintenance information which is composed of an extraction circuit or an extraction apparatus for extracting predetermined maintenance information from the plurality of maintenance information included in the received multiplexed tributary signal, and an insertion circuit or an insertion apparatus for inserting extracted maintenance information into a predetermined location in the overhead bytes of the multiplexed high-speed signal to be transmitted. The overhead passing circuit or apparatus may be additionally provided with an cross-connecting circuit or cross-connecting apparatus for cross-connecting extracted maintenance information.

Also, the multiplex transmission apparatus receives a plurality of multiplexed tributary signals each comprising a payload and overhead bytes including a plurality of maintenance information associated with administration and maintenance operations, performs termination processing for the plurality of maintenance information and multiplexing of the plurality of payloads in a payload having a larger multiplexing degree, converts the plurality of multiplexed tributary signals into a multiplexed high-speed signal comprising the larger payload and overhead bytes, added to the large payload, having a size larger than the overhead bytes on the tributary side including a plurality of maintenance information associated with administration and maintenance operations, and transmits the multiplexed high-speed signal. The multiplex transmission apparatus comprises an overhead passing circuit or a passing apparatus for passing maintenance information which is composed of an extraction circuit or an extraction apparatus for extracting predetermined maintenance information from the plurality of tributary maintenance information, an cross-connecting circuit or a cross-connecting apparatus for cross-connecting information extracted by the extraction circuit or apparatus, and an insertion circuit or an insertion apparatus for inserting an output of the cross-connecting circuit or apparatus into a predetermined location of the high-speed overhead bytes, wherein the maintenance information received from the plurality of transmission paths is collectively transferred or passed.

A far-end transmission apparatus connecting this multiplex transmission apparatus through high-speed transmission line comprises an overhead passing circuit or passing apparatus which is composed of an extraction circuit or an extraction apparatus for extracting predetermined maintenance information from a plurality of high-speed maintenance information, a cross-connecting circuit or a cross-connecting apparatus for cross-connecting information extracted by the extraction circuit or apparatus, and an insertion circuit or an insertion apparatus for inserting an output of the cross-connecting circuit or apparatus into a predetermined location of the tributary overhead bytes, wherein upon receiving high-speed overhead bytes including maintenance information collectively transferred thereto, these signals are extracted, cross-connected, and inserted into predetermined locations of a plurality of tributary overhead bytes to be transmitted onto a plurality of tributary transmission lines.

Here, each of the foregoing multiplex transmission apparatuses processes the multiplexed signals defined in Recommendation G. 707 of International Telecommunication Union or in Standard T1. 105 of American National Standard Institute. Maintenance information to be passed is that included in a section overhead and a line overhead of tributaries. The maintenance information to be passed is transferred in a line overhead of a multiplexed high-speed signal. In addition, when these multiplexers are directly connected without regenerators, a section overhead is also used to pass or transfer an increased amount of maintenance information. When E byte, F byte, D byte, K byte, and Z byte, defined by the standard, are to be passed as maintenance information, these bytes are selected and passed as they are.

On the other hand, as a configuration for passing information on number of errors on a transmission path such as B bytes defined by the standard, a transfer circuit or a transfer apparatus is provided as follows. The transfer circuit or apparatus, upon detecting the number of errors which have occurred on a receiving tributary transmission line, inserts this number of occurring errors into an overhead byte of a multiplexed high-speed signal such that the number of errors is transferred in the multiplexed high-speed signal. Then, a far-end multiplex transmission apparatus which receives transferred maintenance information comprises an extraction circuit or an extraction apparatus for extracting the number of transmission errors of near-end tributary, an adder circuit or an adding apparatus for adding the extracted number of transmission errors of the near-end tributary and the number of high-speed transmission errors detected by this multiplex transmission apparatus, and a circuit or an apparatus for inserting the addition result into a second high-speed signal overhead and transferring the overhead, or for adding the number of transmission errors corresponding to the addition result to an error detecting signal of tributary. For another configuration or method, a multiplex transmission apparatus located in the middle of a high-speed transmission line transfer the number of transmission errors in tributary, and a multiplex transmission apparatus comprises detector circuit or a detecting apparatus for detecting the number of errors which have occurred in a high-speed transmission lines, an extraction circuit or an extraction apparatus for extracting the number of transmission errors of the near-end tributary, an adder circuit or an adding apparatus for adding the extracted number of transmission errors and the number of transmission errors detected by the detector circuit or apparatus, and a circuit or an apparatus for adding the number of transmission errors corresponding to the addition result to an error detecting signal of tributary.

Furthermore, to solve the problems mentioned above, a multiplex transmission network according to the present invention employs the apparatus as described above for a multiplex transmission apparatus for passing arbitrary maintenance information of the tributaries through intermediate multiplexers between arbitrary multiplex transmission apparatuses, so that the arbitrary multiplex transmission apparatuses transmit and receive arbitrary maintenance information of the tributaries therebetween.

BRIEF DESCRIPTION OF THE DRAWINGS

FIG. 3 is a function explanation diagram for explaining the functions of overheads in a multiplexed signal;

FIG. 7 is an overhead structure diagram for explaining how tributary overheads are passed through a transmission apparatus according to the present invention;

DESCRIPTION OF THE PREFERRED EMBODIMENTS

Embodiments of transmission apparatuses as well as embodiments of transmission systems and networks according to the present invention will hereinafter be described in detail with reference to the accompanying drawings.

It should be first noted that the embodiments of the present invention are described, as an example, with reference to transmission apparatuses and transmission systems mainly used in conformity to SONET. While a conventional transmission system is such that an overhead of a transmission frame is terminated at each apparatus, a transmission apparatus of the present invention has a function of passing a tributary overhead therethrough to enable desired apparatuses within a transmission network to transmit and receive the overhead, thereby making it possible to improve the administration and maintenance operation performance of the transmission apparatus. Transmission apparatuses and transmission systems using the SDH will also have substantially the same configurations.

For facilitating the understanding of the present invention, the configurations and operations defined by SONET and SDH are briefly explained prior to descriptions on the configurations and operations of transmission apparatuses and transmission systems according to the present invention.

Figure 1:
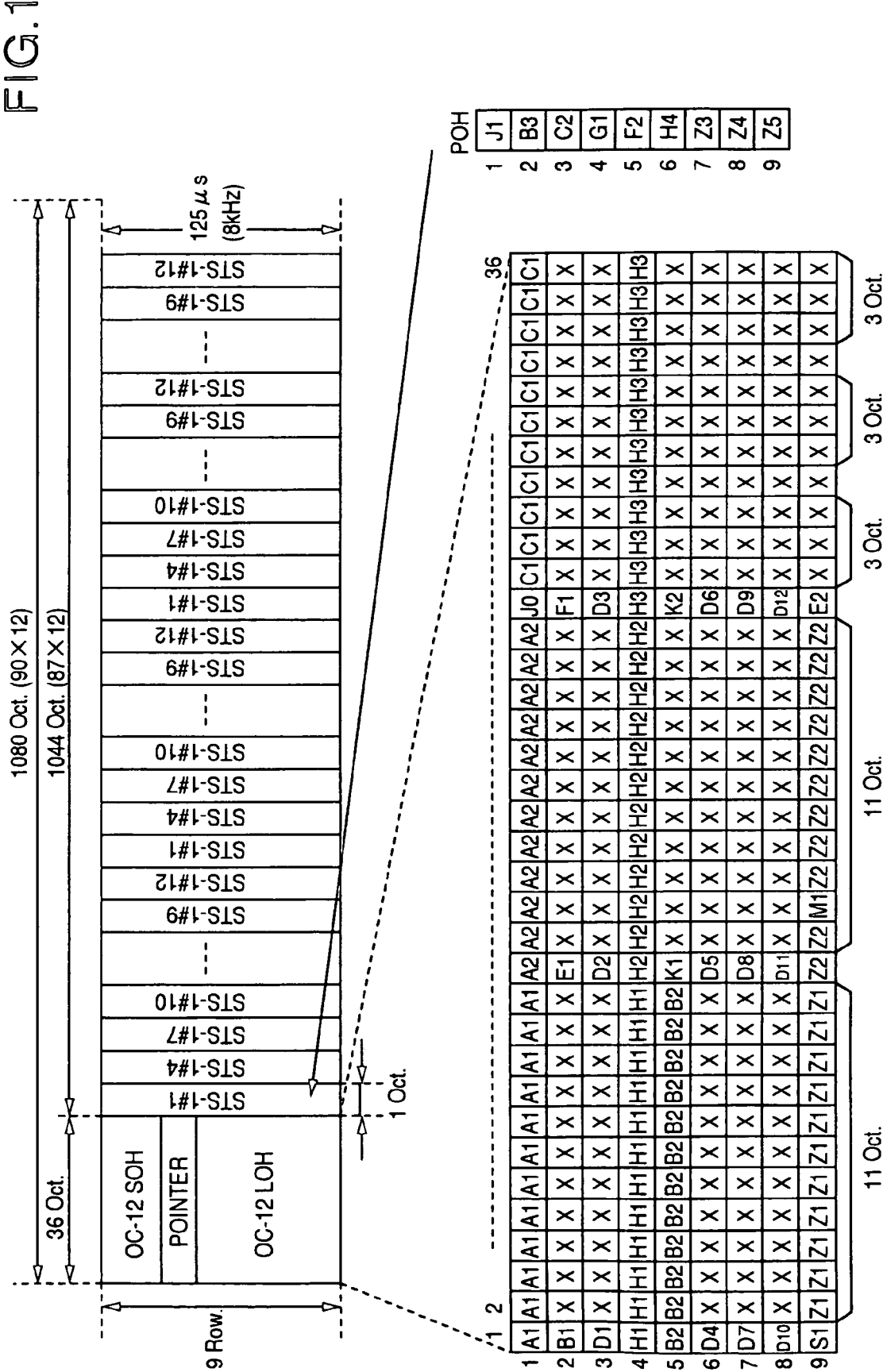
FIG. 1 is a frame structure diagram illustrating the structure of a frame of a tributary multiplexed signal (OC-12)
Figure 2:
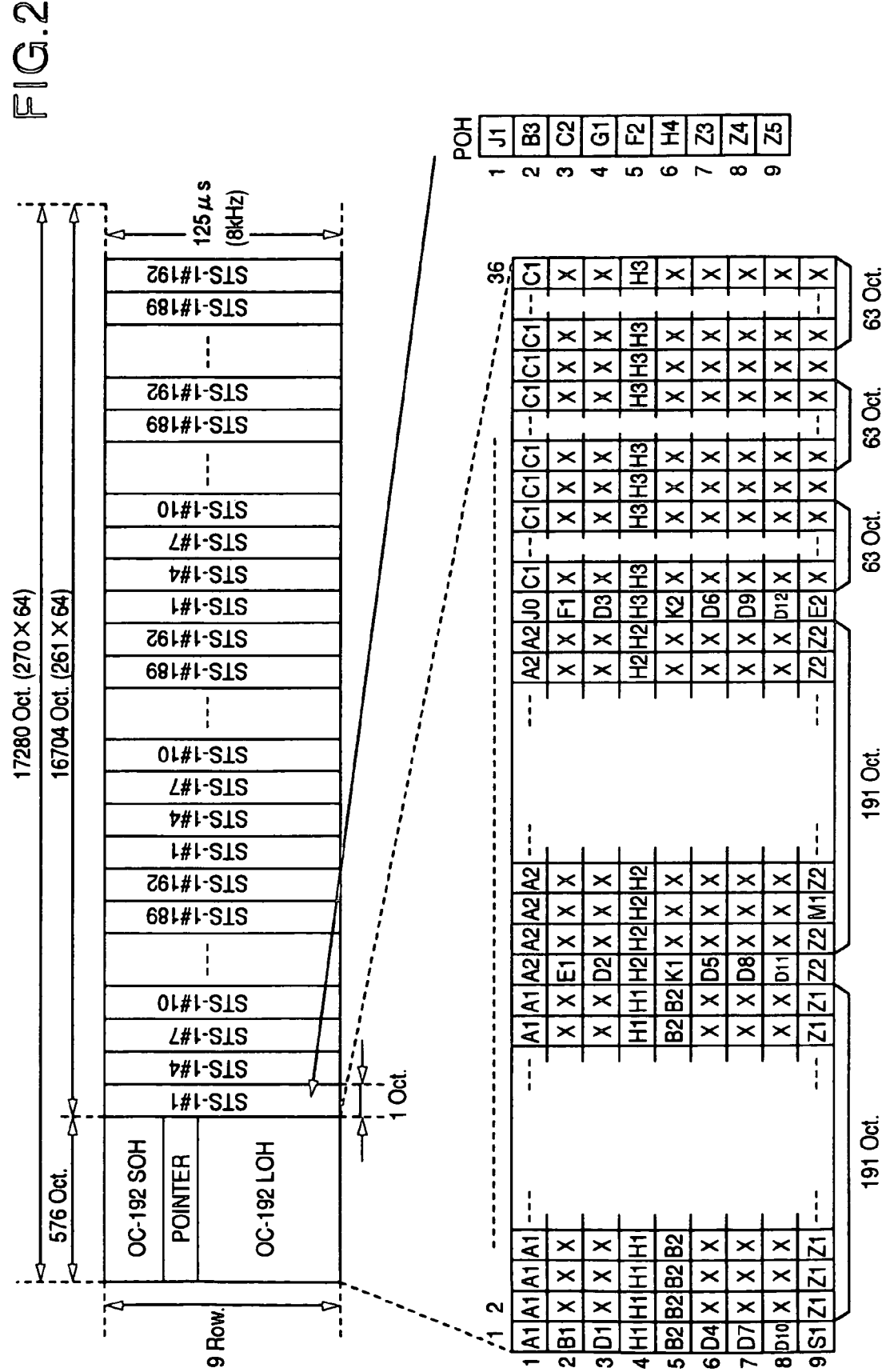
FIG. 2 is a frame structure diagram illustrating the structure of a frame of a high speed multiplexed signal (OC-192)

FIGS. 1 and 2, which are frame structure diagrams illustrating the structures of frames in multiplexed signals defined by SONET, illustrate the configurations of multiplexed signals of OC-12 (622.08 Mb/s) and OC-192

(9953.28 Mb/s). FIG. 3 is an explanatory diagram showing functions of respective overhead bytes included in a multiplexed signal. In FIGS. 1-3, signals in columns 1-36 (OC-12) or in columns 1-576 (OC-192) constitute an overhead (see FIG. 3 as for functions of respective bytes. Undefined bytes are indicated by "x" in FIGS. 1 and 2), and the remaining area constitutes a payload portion in which main signals are multiplexed.

Figure 4A:
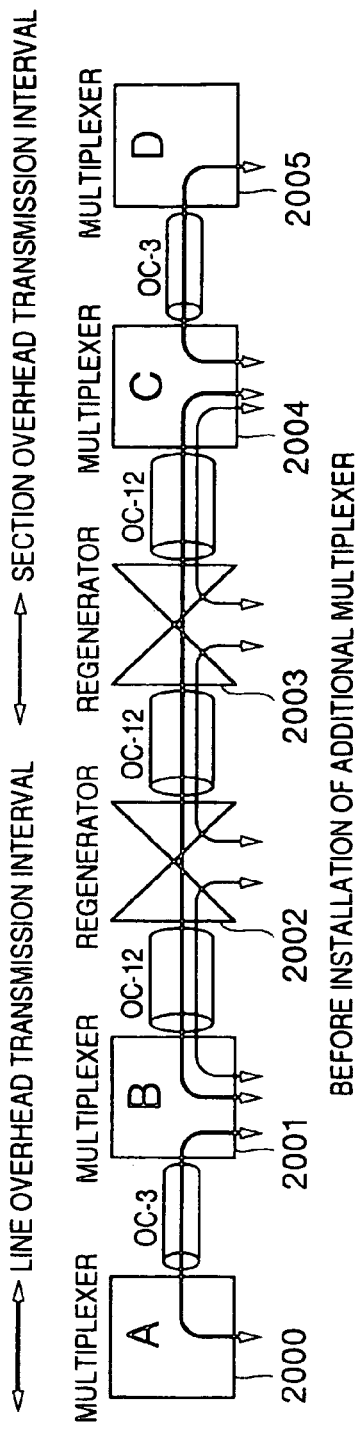
FIGS. 4A, 4B and 4C are network configuration diagrams for explaining the configuration of transmission networks and overhead processing intervals.
Figure 4B:
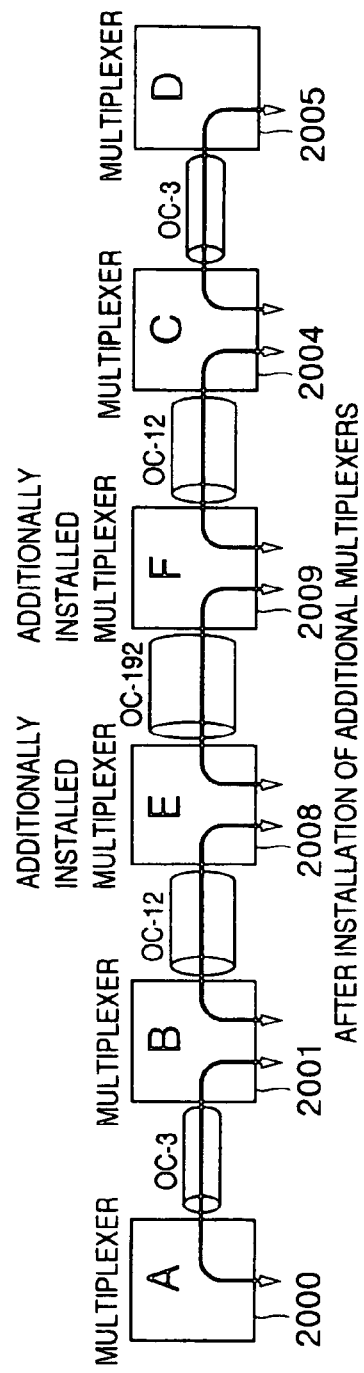
Figure 4C:
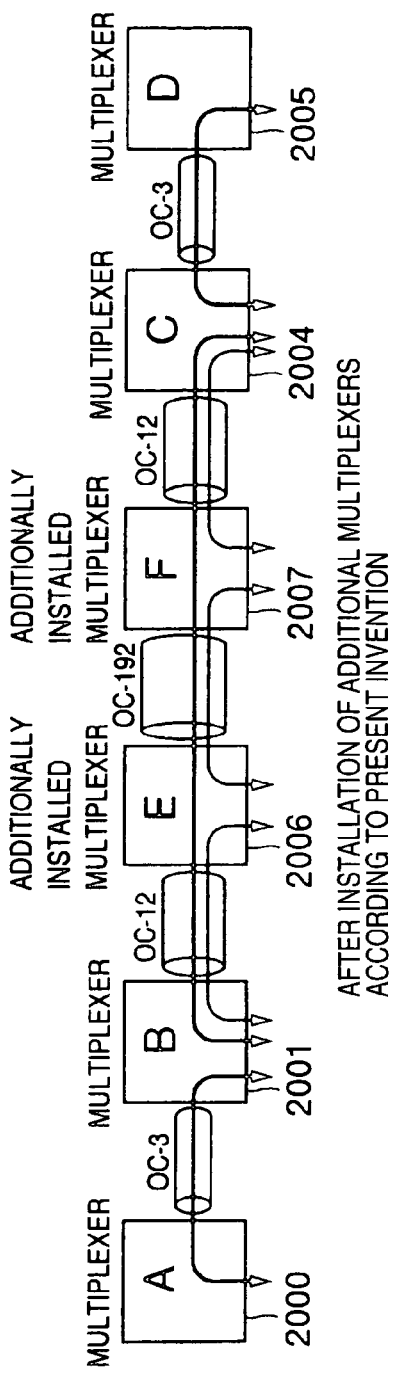

FIGS. 4A-4C are network configuration diagrams for explaining the configurations of transmission networks adopting SDH or SONET and transmission intervals through which overheads are transmitted. Within each of the overheads in the multiplexed signals, rows 1-3 constitute a so-called section overhead which is associated with administration and maintenance operations for each transmission span (defined as a "section") between transmission apparatuses and/or regenerators. An overhead generated in an apparatus (including a regenerator) is transmitted through a transmission span and terminated at a next apparatus (as indicated by an arrowed thin solid line in FIG. 4A). Within consecutive overhead, rows 5-9 constitute a so-called line overhead which is associated with administration and maintenance operations for consecutive transmission spans (defined as a "line") between transmission apparatuses which are to process multiplexed main signals. An line overhead generated in a transmission apparatus is transmitted through transmission spans and regenerator(s), and terminated at a next transmission apparatus (as indicated by an arrowed fat solid line in FIG. 4A). Bytes in the fourth row of the overhead serve as pointers.

In the transmission network illustrated in FIG. 4A, a multiplexer B (2001) and a multiplexer C (2004) are connected by an OC-12 transmission line through regenerators 2002, 2003. For example, when D bytes referred to as data communication channels and E-byes referred to as orderwires are to be transmitted and received for administration and maintenance operations between the multiplexers B (2001) and C (2004), one of the multiplexers (for example, B) inserts data and speech signals required to the maintenance operation into D4-D12 bytes and E2 byte in a line overhead and transmits the line overhead onto the OC-12 transmission line. Since the line overhead is transmitted through the OC-12 transmission line and regenerators and terminated at the multiplexer (C in FIG. 4A) on the reception side, the administration and maintenance operations are carried out between the multiplexers B (2001) and C (2004).

However, if the number of subscribers increases or if the amount of transmitted and received signals is increased, installation of additional multiplexers and modifications to the transmission network may be required corresponding to the increase in subscribers or signals. FIG. 4B illustrates an example of a modified network, where multiplexers corresponding to the multiplexers B (2001), C (2004) are additionally installed (for simplicity, one each of the multiplexers B (2001), C (2004) only is illustrated in FIG. 4B), while a plurality of high speed and large-scaled multiplexers E (2008), F (2009) are introduced in place of the regenerators 2002, 2003 and connected by a high speed transmission path OC-192 for processing a larger amount of signals at a higher rate, thus modifying the transmission network.

When the transmission network is modified from the configuration illustrated in FIG. 4A to the configuration illustrated in FIG. 4B due to an increase in the amount of communications, an overhead from the multiplexer B (2001) is terminated at the multiplexer E (2008) because SDH or SONET defines that a line overhead is terminated at each multiplexer. If no countermeasures were taken, the modification in the transmission network would result in lack of the administration and maintenance operations previously performed between the multiplexers B (2001) and C (2004) using the overhead before the installation of the additional multiplexers (FIG. 4A).

To solve this problem, the present invention provides each multiplexer with a function of passing a tributary overhead therethrough, as illustrated in FIG. 4(C). Then, by building a communication network with the multiplexer of the invention, an overhead can be transmitted and received between desired apparatuses within a transmission system, thereby making it possible to improve the administration and maintenance operations of the transmission system. In the following, the transmission apparatus and the transmission system as well as an overhead transmission/reception method according to the present invention will be described in detail in terms of their configurations and operations.

Figure 5:
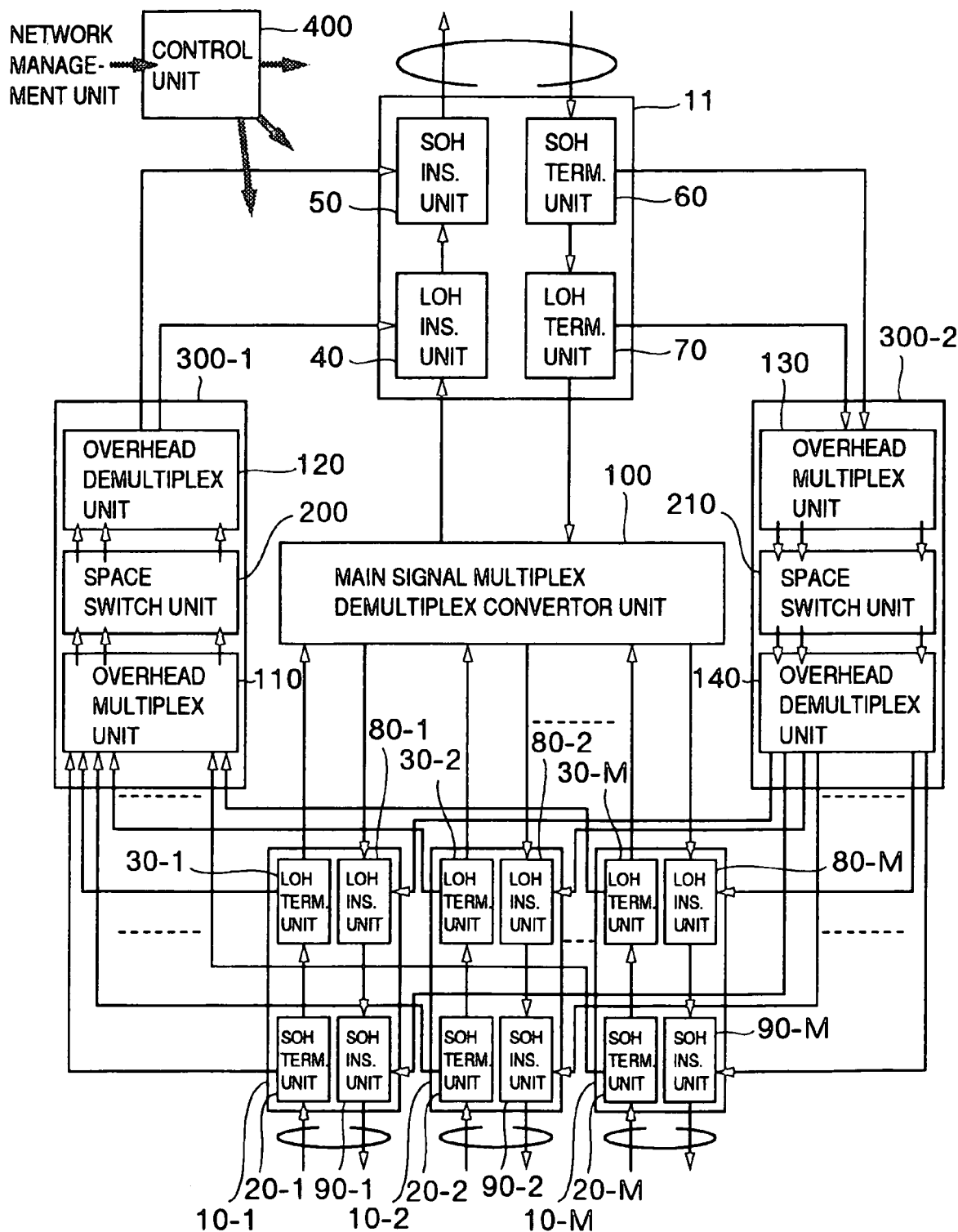
FIG. 5 is a block configuration diagram illustrating the configuration of a transmission apparatus according to the present invention.

FIG. 5 is a block configuration diagram illustrating an embodiment of a multiplexer according to the present invention. The multiplexer of the present invention accommodates a plurality of tributary multiplexed signals each including overheads and multiplexed main signals and a high speed multiplexed signal including overheads and multiplexed main signals to perform processing such as termination, replacement, and so on of overheads in each multiplexed signal as well as demultiplexes the multiplexed main signals in the plurality of tributary multiplexed signals and the multiplexed main signal in the one high speed multiplexed signal. For example, the multiplexer of the present invention accommodates 16 OC-12s (622.08 Mb/s, see FIG. 1) as tributary multiplexed signals, and performs multiplexing/demultiplexing of main signals between the tributary multiplexed signals and the high speed multiplexed signal OC-192 (9953.28 Mb/s, see FIG. 2) and overhead processing as defined by SONET. In addition, the multiplexer passes a tributary overhead in a tributary multiplexed signal inputted thereto. It is of course understood that the foregoing is a mere example, and multiplexed signals to be accommodated may be transmitted at any other rate than OC-1~192 or the rate defined by SDH, and the number of multiplexed signals to be accommodated may be varied depending on the type of multiplexed signals to be accommodated.

In FIG. 5, the multiplexer according to the present invention comprises M sets of tributary signal transmission/reception units 10-1~10-M for inputting and outputting tributary multiplexed signals to process overheads and main signals included therein; a set of high speed signal transmission/reception unit 11 for inputting and outputting a high speed multiplexed signal to process overheads and main signals included therein; a main signal multiplex/demultiplex convertor unit 100 for multiplexing/demultiplexing and converting the main signals in the tributary multiplexed signals and the main signals in the high speed multiplexed signal; overhead processing units 300 (300-1, 300-2), constituting a feature of the present invention, each for crossconnecting overheads included in each of the tributary multiplexed signals and the high speed multiplexed signal and for passing the crossconnected overheads through the multiplexer itself; and a control unit 400 for controlling the entire multiplexer. The multiplexer is composed of the above components to perform multiplexing/demultiplexing and conversion of the signals and overhead processing.

More specifically, each of the tributary signal transmission/reception units 10-1~10-N comprises a SOH (section overhead) termination unit 20-1~20-N for performing the reception of a tributary signal and the processing for a received section overhead and for extracting a portion of section overhead bytes which is passed therethrough and transmitted to far end multiplexer; a LOH (line overhead) termination unit 30-1~30-N for processing a received line overhead and for extracting a portion of line overhead bytes in a manner similar to the section overhead; a LOH insertion unit 80-1~80-N for adding transmitted line overhead bytes and for inserting line overhead bytes transmitted from far end multiplexer; and a SOH insertion unit 90-1~90-M for adding transmitted section overhead bytes, for inserting section overhead bytes transmitted from far end multiplexer, and for transmitting a tributary signal. The high speed transmission/reception unit 11 comprises a high speed signal SOH termination unit 60; a LOH termination unit 70; a LOH insertion unit 40; and a SOH insertion unit 50, all of which are similar to the corresponding units in the tributary signal transmission/reception unit 10. Each of the overhead processing units 300-1, 300-2 comprises an overhead multiplex unit 110, 130 for collecting overheads extracted from each multiplexed signal by the transmission/reception unit (10-1~10-M, 11); a space switch unit 200, 210 for crossconnecting collected overheads in accordance with predetermined rules in order to transmit the overheads to far-end multiplexer; and an overhead demultiplex unit 120, 140 for distributing the crossconnected overheads to the LOH insertion units or to the SOH insertion units of the respective multiplexed signal transmission/reception units (10-1~10-M, 11). With the configuration mentioned above, the present invention provides a multiplexer which accommodates tributary multiplexed signals and a high speed multiplexed signal for multiplexing/demultiplexing main signals included therein, passes therethrough certain tributary overheads, which have been previously determined in a transmission system using the multiplexers, and processes (terminates/adds) the overheads, so as to enable desired multiplexers to use the overheads therebetween, thus making it possible to provide a multiplexer which is superior in administration and maintenance operation capability as well as achieves a highly usable and flexible system configuration.

In the following, the configuration and operation of the multiplexer and the operation of the transmission system according to the present invention will be described in connection with an example in which overheads in 15 multiplexed signals within tributary signals (orderwires E1, E2, data channels D1-D12, transmission switching control bytes K1, K2, inter-line (apparatus-to-apparatus) error administration byte B2) are passed through a multiplexer which accommodates a high speed multiplexed signal through OC-192 and tributary multiplexed signals through 16 OC-12s, and used between 15 pairs of transmission apparatuses which use the tributary multiplexed signals (between the multiplexers B and C illustrated in FIG. 4B).

Figure 6:
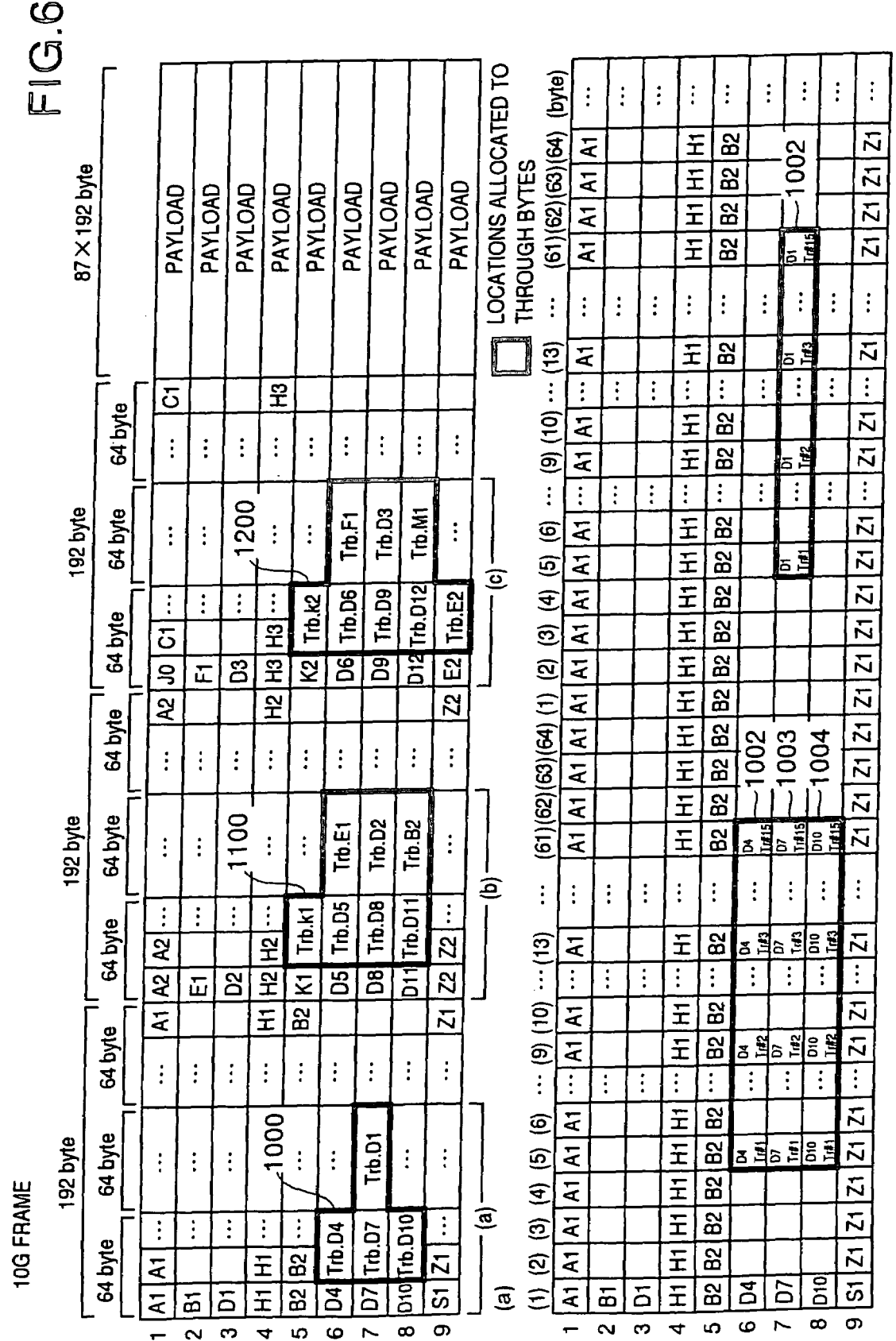
FIG. 6 is an overhead structure diagram for explaining how tributary overheads are passed through a transmission apparatus (multiplexer) according to the present invention.
Figure 7:
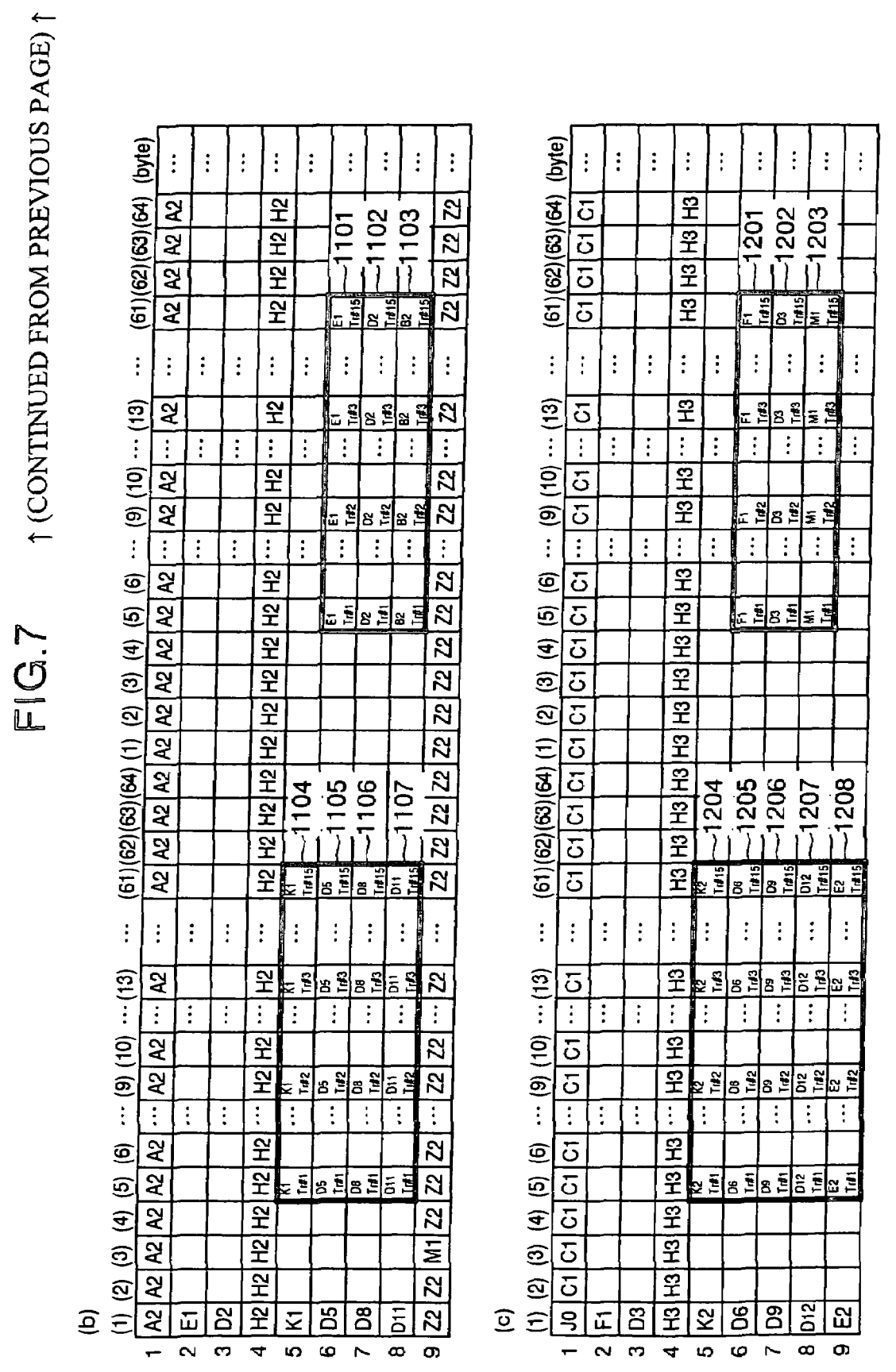

FIGS. 6 and 7 are overhead structure diagrams illustrating overheads in a high speed signal used in the multiplexer of this embodiment, into which certain overheads in tributary signals are inserted so that the overheads are passed to far end multiplexer. Specifically, FIG. 6 illustrates a general configuration of the overheads and a detailed configuration of a portion of the overheads, and FIG. 7 illustrates a detailed configuration of the remaining overheads.

First explained is a multiplexing operation for receiving tributary multiplexed signals, converting them into a high speed multiplexed signal, and transmitting the high speed multiplexed signal.

The SOH termination units 20-1~20-M and the LOH termination units 30-1~30-M of the respective tributary signal transmission/reception units 10-1~10-M perform normal termination processing for overheads of received multiplexed signals in a manner similar to that performed by a normal multiplexer, and send main signals to the main signal multiplex/demultiplex convertor unit 100. Here, the normal termination processing refers to a check for the normality of a section and a line between the multiplexer itself and a far end tributary transmission apparatus on the tributary multiplexed signal transmission side, wherein the synchronization of the tributary multiplexed signals is established using A byte, and erroneous signals are checked by B1 byte, by way of example. In other words, the processing associated with administration and maintenance operations of the tributary line or section is performed using overheads, for example, defined by ANSI T. 105. The main signals of the tributary multiplexed signals are multiplexed in main signals of a high speed signal in accordance with multiplexing rules (for example, mapping from FIG. 1 to FIG. 2) previously determined in the main signal multiplex convertor unit 100. On the other hand, the multiplexer of the present invention passes a portion of these tributary overheads for use between desired multiplexers, so that the SOH termination units 20-1~20-M and the LOH termination units 30-1~30-M drop received overheads (except for B2 bytes) as they are so as to transmit the overheads to the overhead processing unit 300-1. Since B2 bytes cannot be simply passed for the reason later described, each of the LOH termination units 30-1~30-M detects the number of errors in a tributary line detected as normal B2 bytes termination processing and transmits the encoded number of detected errors to the overhead processing unit 300-1.

The overhead processing unit 300-1 performs cross-connecting and processing for selecting a portion of the tributary overheads and inserting the selected tributary overheads into an undefined area of overheads in a high speed multiplexed signal to be transmitted, in order to pass therethrough the selected portion of the tributary overheads received by the multiplexer to transmit to far end multiplexer. The overhead multiplex unit 110 collects overheads transmitted from the respective tributary signal transmission/reception units 10-1~10-M. Specifically, when tributary multiplexed signals are 16 OC-12s, the overheads formatted as illustrated in FIG. 1 are sent from the respective tributary signal transmission/reception units 10-1~10-M, so that the respective units 10-1~10-M are sequentially accessed using a multiplexer in the multiplex transmission apparatus to select tributary overheads from the respective units 10-1~10-M, which are to be passed, and the selected overheads are grouped in accordance with the type of overheads. As an example, D4 bytes (see FIG. 1) located in the sixth row, the first column of respective tributary multiplexed signals are collected and mapped in the high speed multiplexed signal from the fifth column to the 61th column of the sixth row (see 1000, 1002 in FIG. 6), such that the D4 bytes are passed by means of the high speed multiplexed signal. In this way, overheads of the tributary multiplexed signals are grouped into respective types and inserted into undefined bytes in high speed multiplexed bytes, so that the respective units are sequentially accessed to collect each type of overheads. More specifically, in the example given above, multiplexing is performed such that only the D4 bytes in the respective tributary multiplexed signals are collected. In addition, the multiplexer in the multiplex transmission apparatus may be provided with a buffer on the input side thereof for enabling the multiplexing even if the respective tributary multiplexed signals are different in the frame phase. Alternatively, the respective units may align the phases of signals to be sent to the overhead multiplex unit 110. While the B2 bytes have been described to be received after the processing in the LOH termination units, the B2 bytes themselves may be received from the LOH termination units so that the above-mentioned processing is performed in the overhead multiplex unit 110.

The space switch unit 200 crossconnects the tributary overhead bytes transmitted thereto from the overhead multiplex unit 110 so as to further rearrange the tributary overhead bytes. While the space switch unit is used in this embodiment, a time switch may of course be used instead. Any switch may be used as long as it can crossconnect the tributary overheads for selection, reordering, and so on, such that the overheads received from respective tributary multiplexed signals can be inserted into predetermined ones of undefined bytes in a high speed multiplexed signal. Specifically, in this embodiment, out of 16 tributary multiplexed signals on OC-12s, overheads of 15 multiplexed signals (1-15) are passed, so that the space switch unit 200 selects only overheads to be passed within the multiplexed signals (1-15) from the output of the overhead multiplex unit 110. The selected overheads include, for example, orderwires E1, E2, data channels D1-D12, automatic protection switching control bytes K1, K2, and line (multiplexer-to-multiplexer) error checking byte B2 (see 1000-1004, 1100-1107, and 1200-1208 in FIGS. 6 and 7). Also, as previously illustrated in FIG. 1, D1 byte located nearer to the head of the frame than D4 byte is inserted into the high speed multiplexed signal after passing through the multiplexer later than D4 byte (see 1000, 1001, 1004 in FIG. 6). In other words, the space switch unit 200 also rearrange the order of tributary overheads to be passed such that a specified type of tributary overhead can be inserted into a previously specified one of undefined bytes in a high speed overhead area.

The overhead demultiplex unit 120 receives tributary overhead bytes sent from the space switch unit 200, and demultiplexes the received overheads into a section overhead and a line overhead using a demultiplexer as well as demultiplexes the received overheads such that they are inserted into previously determined bytes in an overhead area of the high speed multiplexed signal illustrated in FIGS. 6 and 7, and transfers the demultiplexed overheads to the high speed signal transmission/reception unit 11. Taking D4 byte of each tributary multiplexed signal as an example, the D4 byte of each tributary multiplexed signal is separated from each tributary multiplexed signal such that D4 bytes of the respective tributary multiplexed signals are inserted into every four columns of the overhead area in the high speed multiplexed signal from the fifth column to the 61st column of the sixth row, as indicated by 1000 and 1002 in FIG. 6.

The high speed signal transmission/reception unit 11 generates overhead bytes for use in a section interval and a line interval of the high speed transmission side, by means of the SOH insertion unit 50 and the LOH insertion unit 40, in a manner similar to a normal multiplexer. In addition, the high speed transmission/reception unit 11 inserts the overhead extracted by the tributary signal reception unit and received from the overhead demultiplex unit 120 into previously specified undefined bytes in a line overhead of a high speed signal, as illustrated in FIGS. 6 and 7, to create overheads to be transmitted which are added to main signals of the high speed signal multiplexed by the main signal multiplex/demultiplex convertor unit 100 to produce a high speed multiplexed signal which is then transmitted from the high speed signal transmission/reception unit 11. It should be noted that in this embodiment, if a regenerator is located in the middle of a transmission path, a section overhead is terminated at the regenerator, so that overheads extracted by the tributary signal reception unit are inserted only into a line overhead area of the high speed signal. Of course, if there is no regenerator in the middle of a transmission line so that a section overhead is not terminated up to a destination transmission apparatus, undefined bytes in a high speed section overhead area may be used for inserting the extracted tributary overheads thereinto. In this case, a larger number of overheads of tributary multiplexed signals can be passed.

Next explained is the operation on the demultiplexing side for converting a received high speed multiplexed signal into tributary multiplexed signals and transmitting the tributary multiplexed signals.

The SOH termination unit 60 and the LOH termination unit 70 of the high speed transmission/reception unit 11 terminate overheads in a received high speed multiplexed signal, similarly to a normal demultiplexer, to send main signals to the main signal multiplex/demultiplex convertor unit 100, in a manner similar to the tributary signal transmission/reception unit 10. The main signals are demultiplexed by the main signal multiplex/demultiplex convertor unit 100 into main signals of tributary signals. On the other hand, since the received overheads include those transmitted from a far end multiplexer, which are to be passed for use as tributary overheads, the SOH termination unit 60 and the LOH termination unit 70 drop the received overheads as they are, and transmits them to the overhead processing unit 300-2.

The overhead processing unit 300-2 performs cross-connecting and processing for selecting overheads to be inserted into predetermined locations in overheads of each tributary multiplexed signals in order to pass a portion of the received overheads for transmission to another tributary transmission apparatus. Thus, the overhead processing unit 300-2 performs, on the demultiplexing side, similar processing to that of the overhead processing unit 300-1 on the multiplexing side in the reverse order. Specifically, the overhead multiplex unit 130 collects overheads which have passed through from the far end multiplexer and received by the high speed signal transmission/reception unit 11, and the space switch unit 210 crossconnects the overheads sent thereto from the overhead multiplex unit 130 so as to again rearrange them. Also, the overhead demultiplex unit 140 demultiplexes the overheads sent from the space switch unit 210 into a section overhead and a line overhead, and demultiplexes the overheads such that they are inserted into the previously specified bytes in the overhead area of each tributary multiplexed signal illustrated in FIG. 1, and transfers the demultiplexed overheads to the respective tributary signal transmission/reception units 10-1~10-M.

Each of the M sets of tributary signal transmission/reception units 10-1~10-M generates overhead bytes for use in a section interval and a line interval of tributary, in a manner similar to a normal multiplexer, by means of the SOH insertion unit 80-1~80-M and the LOH insertion unit 90-1~90-M, and inserts overheads extracted by the high speed signal reception unit and received from the overhead demultiplex unit 140 into previously specified overhead bytes in the line overhead area of the tributary signal, as illustrated in FIG. 1, to create overheads to be transmitted, which are added to tributary main signals demultiplexed by the main signal multiplex/demultiplex convertor unit 100 to generate a tributary multiplexed signal which is then transmitted to the tributary transmission line.

Next, the processing of passing the B2 bytes in the transmission apparatus capable of passing received tributary overheads to far end transmission apparatus, in accordance with the present invention, will be explained in connection with the multiplexer used in the foregoing embodiment.

Figure 8:
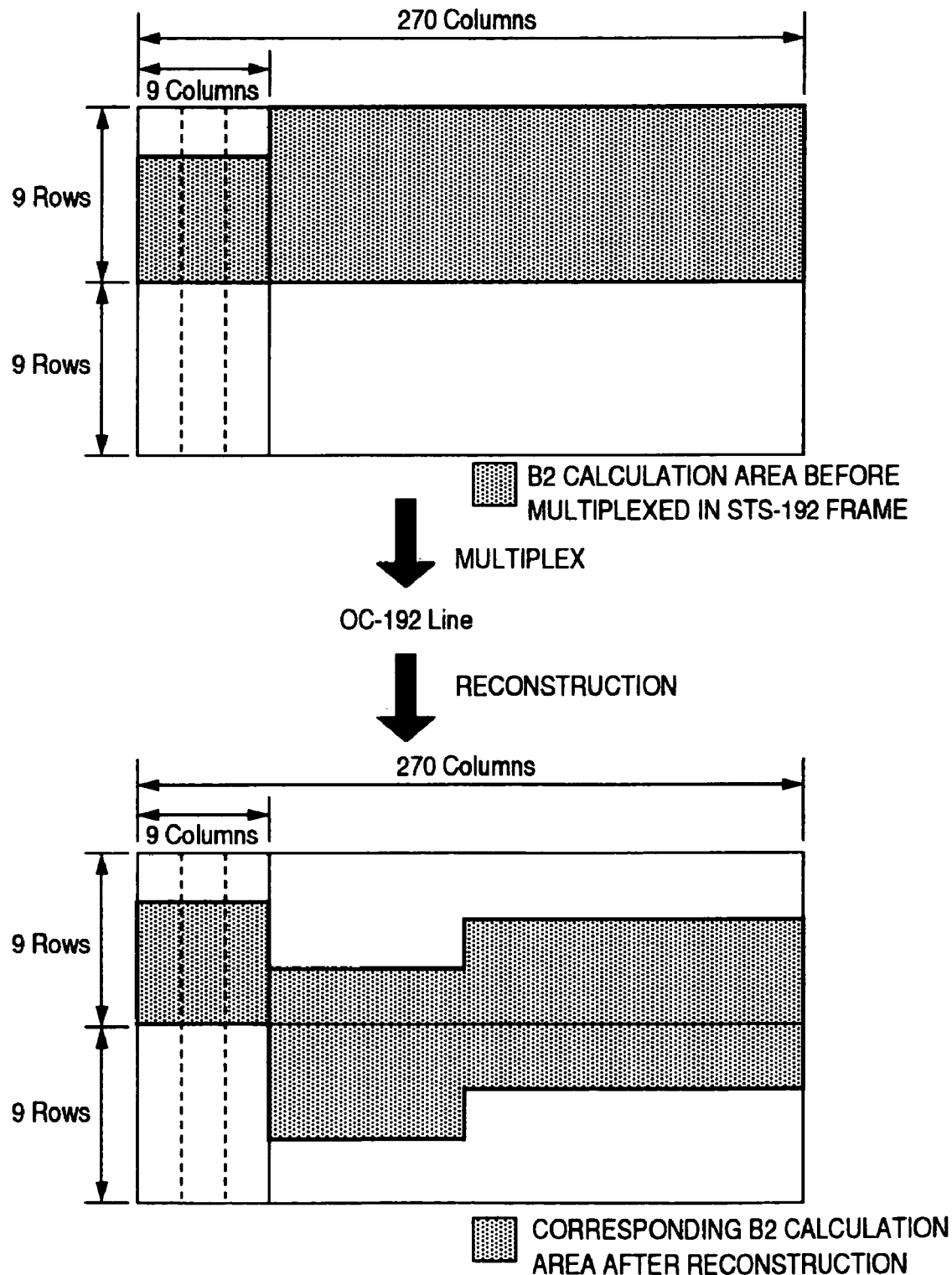
FIG. 8 is an operation explanation diagram for indicating a calculation area of a tributary overhead (B2 bytes) in the transmission apparatus according to the present invention.

FIG. 8 is an operation explanation diagram for explaining a B2-byte calculation area for detecting transmission errors in a line interval in a transmission apparatus used in conformity to SONET or SDH. The transmission apparatus used in conformity to SONET or SDH uses a pointer located in the overhead area as illustrated in FIG. 1 (H-bytes on the fourth row) to identify the phase of a multiplexed signal for signal processing such as multiplexing/demultiplexing, in order to reduce a delay of the multiplexed signal. Each transmission apparatus only updates the pointer to a frame forming a multiplexed signal for again identifying the frame, and does not adjust the phase of the frame on an apparatus-by-apparatus basis as does a conventional transmission apparatus. For this reason, a pointer update causes a deviation between the B2 calculation area of a received multiplexed signal and the B2 calculation area of a multiplexed signal to be transmitted, as illustrated in FIG. 8, whereby even if received B2 bytes are passed in a manner similar to other overhead bytes, a transmission apparatus receiving overheads cannot correctly detect errors which is notified by the received B2 bytes.

Stated another way, since the B2 bytes cannot be directly passed as mentioned above, the multiplexing side of the multiplexer is configured such that the respective LOH termination units 30-1~30-M of the tributary signal transmission/reception units read (terminate) the B2 bytes to determine the number of detected errors, and pass a signal encoding the number of detected errors (designated by "j" in the following explanation) to notify a destination transmission apparatus of the number of errors. Specifically, the B2 bytes of each tributary multiplexed signal (first to 12th columns on the fifth row in FIG. 1) are terminated to create a signal (indicative of the number of errors j) which is inserted into undefined bytes in the overhead area of a high speed multiplexed signal (1103 in FIG. 7), and then transmitted in the high speed multiplexed signal.

On the demultiplexing side of the multiplexer, the signal indicative of the number of errors j cannot be sent to a tributary as it is, in a manner similar to other overhead bytes, because it is different from B2 bytes definition, so that the number of errors cannot be detected in the tributary far end apparatus. In addition, it is the number of errors which have occurred between a transmission path between desired transmission apparatuses (between the transmission apparatuses B and C in FIG. 4B) that is desired to be transmitted and received. However, since the value of j does not include the number of errors which have occurred on the high speed transmission line between the multiplexers, the high speed line erors are also considered. Thus, the demultiplexing side of the multiplexer of this embodiment is configured to perform the following processing in addition to the processing described above in connection to the processing performed on the B2 bytes.

First, the LOH termination unit 70 of the high speed signal transmission/reception unit 11 reads (terminate) the B2 bytes for detecting transmission errors between the high speed multiplexers (the B2 bytes have been defined in the original high speed multiplexed signal and are shown in the first to 192nd columns of the fifth row in the structure diagrams of FIGS. 2 and 6) to find the number of errors i. The LOH termination unit 70 also separates the encoded number of detected errors j from a line overhead (1103 in FIG. 6) of the high speed signal, and calculates the sum k of i and j.

Next, the overhead multiplex unit 130 of the overhead processing unit 300-2 multiplexes this k value with other overhead bytes and transmits them to the space switch unit 210. The space switch unit 210 rearranges the transferred overhead bytes so as to be directed to the respective tributary signal transmission/reception units. The overhead demultiplex unit 140 demultiplexes the overhead bytes sent from the space switch unit 210 into section overheads and line overheads which are transferred to the M sets of tributary signal transmission/reception units 10-1~10-M.

Then, the LOH insertion units 80-1~80-M each generate B2 parities for one frame to be transmitted, invert a number of bits corresponding to the value of k, insert the B2 bytes as an overhead of a tributary signal, and transmit the overheads onto a tributary transmission line, thereby enabling a tributary far end transmission apparatus to detect errors. It will be of course appreciated that the operation for the B2 bytes on the demultiplexing side may be performed in a manner similar to that on the multiplexing side, i.e., the calculation of k may be performed in the overhead multiplex unit 130, or the calculation of k and the inversion of bits may be collectively performed in the LOH insertion units 80-1~80-M.

The multiplexer, which is an embodiment of the transmission apparatus of the present invention described above, is configured such that, when information on the system configuration is received from a network management unit or the like, not shown, the control unit 400 determines settings for the overhead processing unit 300, the multiplexed signal transmission/reception units 10-1~10-M and 11, and so on to thereby enable the selection of the type of overheads to be passed through the multiplexer and the selection of the locations of undefined bytes into which the overheads are inserted.

Figure 9:
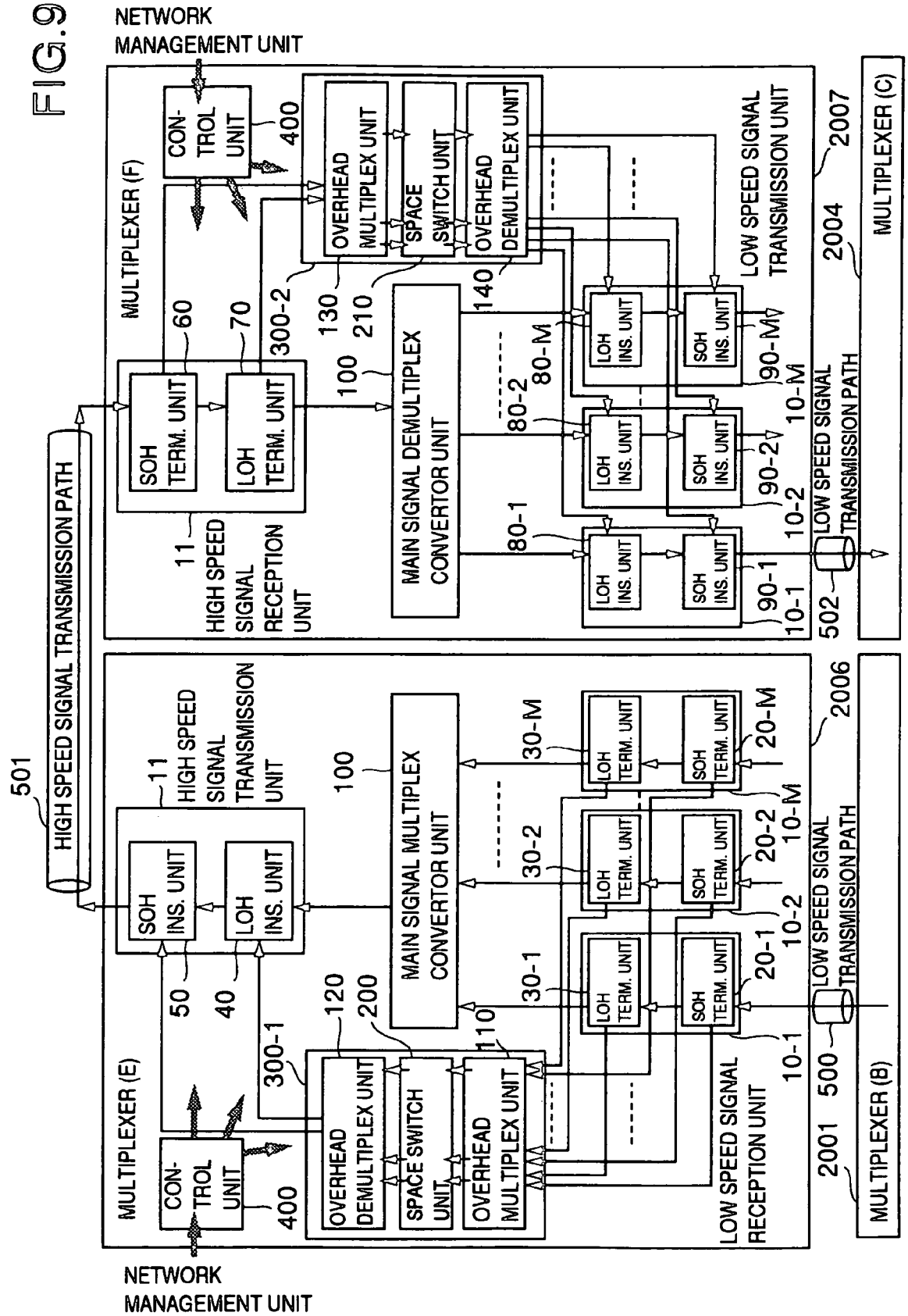
FIG. 9 is a network configuration diagram illustrating the configuration of a transmission network employing the transmission apparatuses according to the present invention.

FIG. 9 is a network configuration diagram illustrating an example of the configuration of a transmission network using the multiplexer of the present invention. More specifically, FIG. 9 illustrates in detail the configuration of a network in which the foregoing multiplexer illustrated in FIG. 5 is employed as the additionally installed multiplexers E, F in the network configuration diagram illustrated in FIG. 4B. It should be noted that FIG. 9 illustrates an example in which overheads are transmitted from a multiplexer B to a multiplexer C, and that the illustrated multiplexers according to the present invention only include the multiplexing side and the demultiplexing side required to the respective multiplexers.

The transmission network employing the multiplexers of the present invention comprises a multiplexer B2001 for multiplexing main signals to transmit a tributary multiplexed signal onto a tributary transmission line 500; a multiplexer E2006 for further multiplexing tributary multiplexed signals to transmit a high speed multiplexed signal onto a high speed signal transmission line 501; a multiplexer unit F2007 for demultiplexing a high speed multiplexed signal received from the high speed transmission line 501 to transmit tributary multiplexed signals onto a tributary signal transmission line 502; and a multiplexer C2004 for further demultiplexing the tributary multiplexed signals to tributary main signals, wherein main signals processed by the multiplexer B2001 is transmitted to the multiplexer C2004, while overheads in tributary multiplexed signals are also transmitted between the multiplexers B2001 and C2004 to perform administration and maintenance operations for the transmission system.

Explaining in greater details, when the multiplexer B2001 generates a tributary multiplexed signal by multiplexing main signals and adding overheads to the multiplexed main signals, and transmits the tributary multiplexed signal onto the tributary signal transmission line 500, the multiplexer E2006 terminates the overheads in the tributary multiplexed signal, multiplexes the main signals, and generates overheads for a high speed multiplexed signal, while it performs the overhead passing processing which constitutes a feature of the present invention. As previously explained with reference to FIGS. 5-7, the passing processing is carried out by the tributary signal SOH termination unit 20 and the tributary signal LOH termination unit 30, the overhead processing unit 300-1 comprising the overhead multiplex unit 110, the space switch unit 200, and the overhead demultiplex unit 120, and the high speed signal LOH insertion unit 40 and the high speed signal SOH insertion unit 50, by selectively crossconnecting overheads in the tributary multiplexed signal specified by the control unit 400 to insert the specified overheads into specified locations in an overhead area of the high speed multiplexed signal (see FIGS. 6 and 7). When specified overheads include the B2 bytes, the B2-byte processing is also performed as described above.

The multiplexer F2007, which has received the high speed multiplexed signal including the overheads to be passed, from the multiplexer E2006 through the high speed transmission line 501, terminates the overheads in the high speed multiplexed signal, demultiplexes main signals, and generates overheads for tributary multiplexed signals, while it performs the overhead passing processing which constitutes a feature of the present invention. This passing processing, as previously explained, is the reverse processing of the passing processing performed by the multiplexer E2006, wherein overheads for tributary multiplexed signals included in the high speed multiplexed signal and specified by the control unit 400 to be passed are selectively crossconnected and inserted into specified locations in the overhead area of the respective tributary multiplexed signals. This overhead passing processing is performed by the high speed signal SOH termination unit 60 and the high speed signal LOH termination unit 70, the overhead processing unit 300-2 comprising the overhead multiplex unit 130, the space switch 210, and the overhead demultiplex unit 140, and the tributary LOH insertion unit 80 and the tributary SOH insertion unit 90. When the specified overheads include the B2 bytes, the B2-byte processing is also performed as described above.

Thus, even in the transmission network in which the multiplexers E, F have been additionally inserted between the original multiplexers B and C, the foregoing configuration and operations enable the overheads in the low passed multiplexed signals as well as main signals to be transmitted between the multiplexers B and C without being terminated at the additional multiplexer E or F.

The multiplex transmission apparatus of the present invention can pass arbitrary overheads in a multiplexed signal with the configuration and operations described in connection with the foregoing embodiment. In other words, even if a transmission system as illustrated in FIG. 4A is modified to a new system as illustrated in FIG. 4B, the multiplexer described in the foregoing embodiment, if employed for newly added multiplexers, passes overheads so far used between the multiplexers B and C without terminating them, so that the overheads can be used also between the multiplexers B and C in the modified system. Thus, the administration and maintenance operation capability between the multiplexers is not affected by the modification to the configuration of the transmission system. In addition, since the multiplexer of the present invention permits overheads to be used between any desired multiplexers, it is possible to provide a multiplexer which has higher administration and maintenance operation capability, offers a user-friendly operability, and supports to build a flexible transmission system.

Next, another embodiment of the multiplexer according to the present invention and an embodiment of a transmission system or a network using the multiplexer will hereinafter be described in detail with reference to the accompanying drawings.

Figure 10:
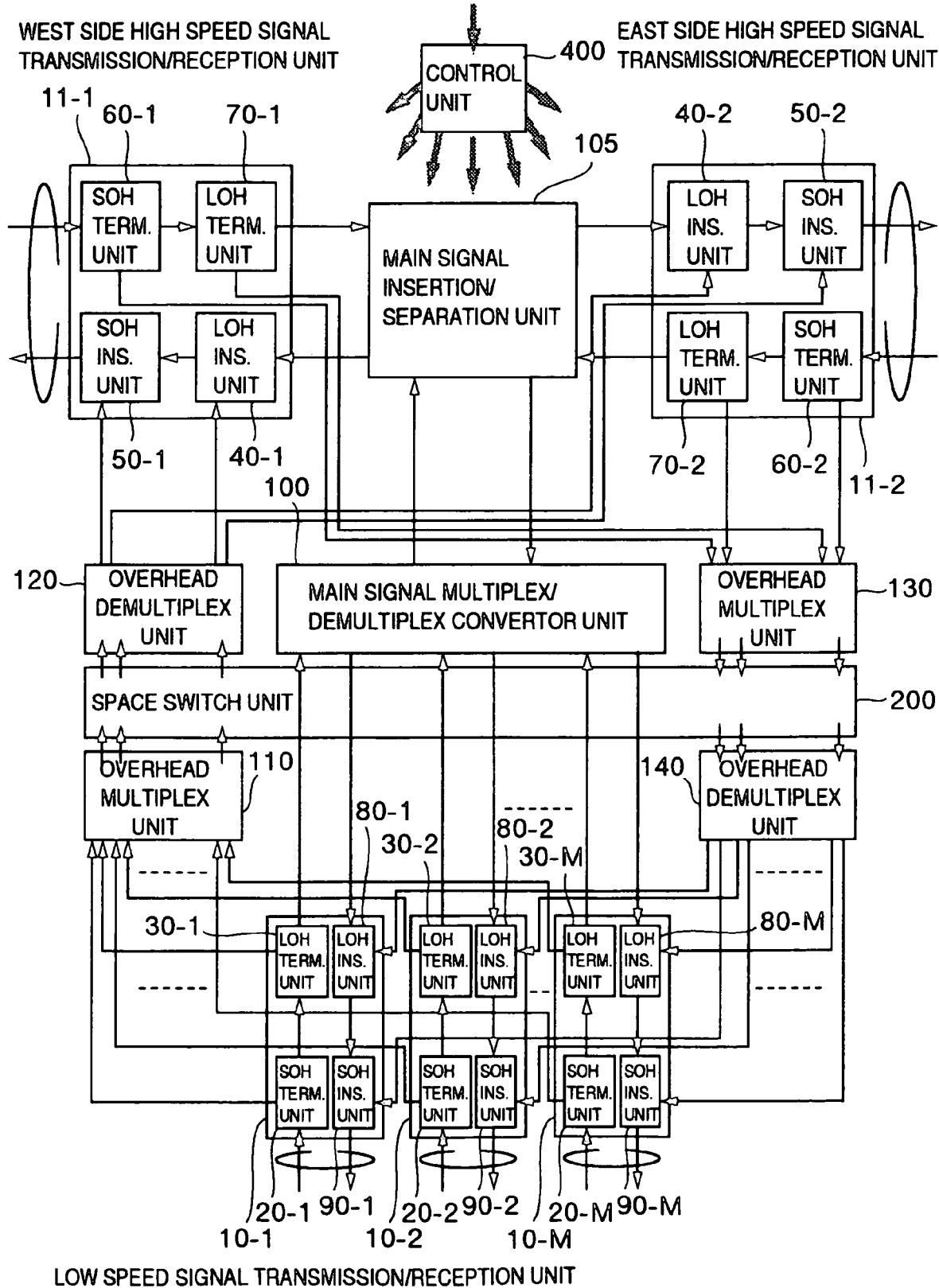
FIG. 10 is a block configuration diagram illustrating the configuration of another transmission apparatus (ADM) according to the present invention.
Figure 11A:
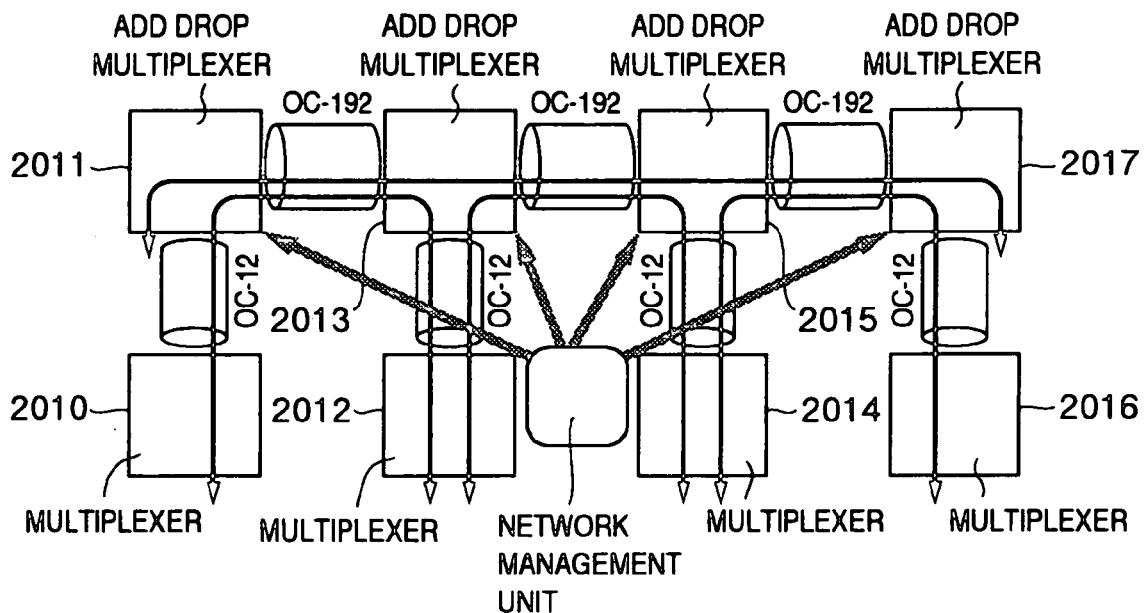
FIGS. 11A and 11B are network configuration diagrams illustrating the configuration of transmission networks employing other transmission apparatuses according to the present invention.
Figure 11B:
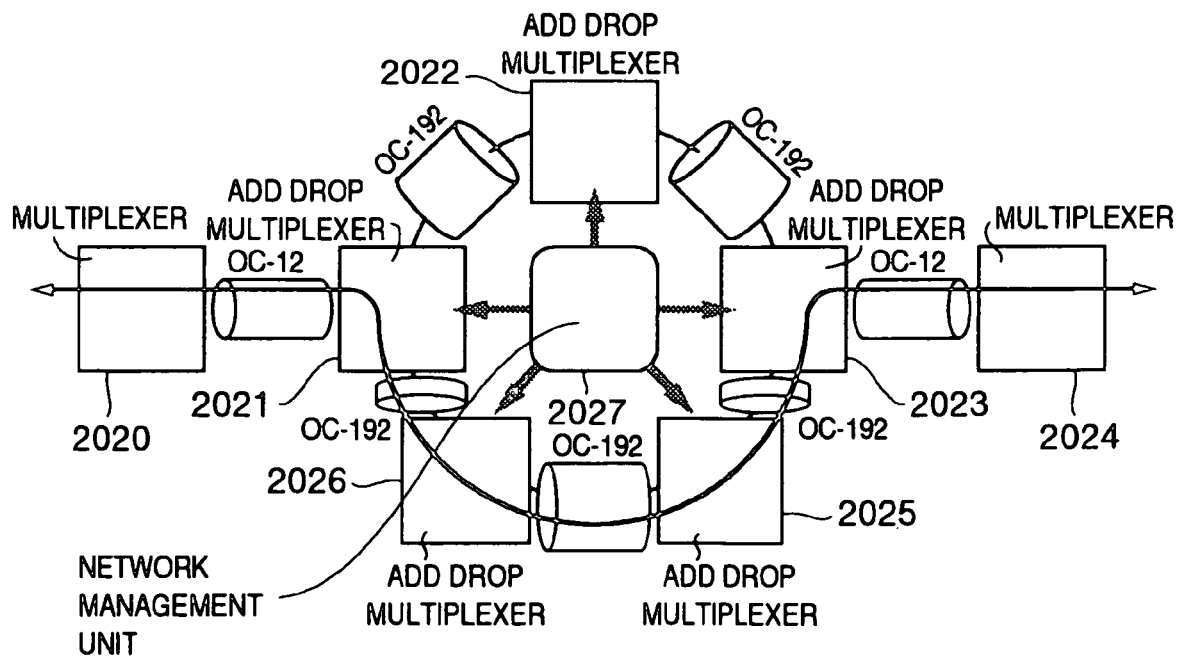

FIG. 10 is a block configuration diagram illustrating an embodiment of an add drop multiplexer (hereinafter abbreviated as "ADM") which is a transmission apparatus according to the present invention. FIGS. 11A and 11B are network configuration diagrams illustrating examples of the configuration of transmission networks using the ADM of the present invention.

The ADM of the present invention accommodates a plurality of tributary multiplexed signals comprising overheads and main signals multiplexed therewith and two high speed multiplexed signals comprising overheads and main signals multiplexed therewith, and performs the processing such as termination, replacement, and so on for the overheads in the respective multiplexed signals. In addition, the ADM inserts a plurality of tributary multiplexed main signals into high speed multiplexed main signals (add), branches a plurality of tributary multiplexed main signals from high speed multiplexed main signals (drop), crossconnects high speed multiplexed main signals with each other (cross-connect), and passes the high speed multiplexed main signals (through). Similarly to the aforementioned embodiment, the tributary multiplexed signals are transmitted through OC-12s, while the high speed multiplexed signals are transmitted through OC-192s. The ADM performs the processing for the main signal and the overhead processing as defined in SONET, and also passes a portion of overheads in the multiplexed signals inputted thereto so that the passed overheads are used by a far end multiplexer. Then, a network employing the ADMs has the ADMs connected to each other through high speed transmission spans (OC-192) in a linear configuration (FIG. 11A) or in a ring configuration (FIG. 11B). In addition, transmission apparatuses such as multiplexers are connected to the ADMs through tributary transmission spans (OC-12). With the configuration described above, the ADMs perform the overhead passing processing in accordance with the present invention to transmit and receive arbitrary overheads in the tributary multiplexed signals between arbitrary multiplexers, in addition to the main signal processing as mentioned above to transmit and receive the main signals between the multiplexers, thereby building a highly flexible transmission system which allows the multiplexers within the network to freely transmit and receive the overheads as well as the main signals therebetween, and provides a higher administration and maintenance operation capability.

The configuration of the ADM is substantially the same as that of the aforementioned multiplexer except for a main signal insertion/separation unit 105 additionally provided for performing add, drop, cross-connect, and through operations for the main signals. The remaining functional blocks used in FIG. 10 are the same as corresponding ones in the aforementioned multiplexer (in FIG. 10, the same functional blocks as those in FIG. 6 are designated the same reference numerals), except for the location and number thereof which are modified to be adapted to the ADM. In the following explanation, only the configuration and operations different from the aforementioned multiplexer will be described in particular.

Since a high speed transmission/reception unit 11 is used to connect the ADMs with each other through a high speed transmission span (see FIGS. 11A, 11B) in this embodiment, two high speed transmission/reception units 11, i.e., a west side unit 11-1 and an east side unit 11-2, are provided in each ADM so as to be connected to ADMs on both sides. Also, a main signal insertion/separation unit 105 is added between the high speed signal transmission/reception units 11-1, 11-2 and a main signal multiplex/demultiplex convertor unit 100 so that the high speed signal transmission/reception units 11-1, 11-2 can be connected to tributary signal transmission/reception units 10-1~10-M, and the high speed signal transmission/reception units 11-1, 11-2 can be connected to each other in order to perform the main signal processing as mentioned above.

Further, the ADM is also adapted to pass overheads from a high speed multiplexed signal to another such that a space switch unit 200 of an overhead processing unit 300 selectively crossconnects overheads to be passed, which have been received from one of the high speed signal transmission/reception units (for example, the East side unit) through an overhead multiplex unit 130, and transmits the crossconnected overheads to the other high speed transmission/reception unit (for example, the WEST side unit) which inserts the overheads to be passed into specified bytes in an overhead area of a high speed multiplexed signal.

Furthermore, when overheads to be passed from a high speed multiplexed signal to another includes information on the B2 bytes, a LOH insertion unit 40 of the high speed signal transmission/reception unit 11 does not perform the bit inversion of the B2 bytes as does the LOH insertion unit 80 of the tributary signal transmission/reception unit 10 in the aforementioned multiplexer, and instead adds the number of errors i (the result of termination of the B2 bytes), which have occurred on an incoming high speed transmission line, to a received number of errors j to derive a total number of errors k which is transmitted as it is. In the alternative, the configuration for detecting transmission errors in this overhead transmission/reception interval may be implemented by a configuration utilizing a tandem connection, later described.

The ADM is also configured to rely on a control unit 400 which indicates to each functional block the types and locations to be inserted for overheads to be passed, such that each functional block responsively performs the crossconnecting, selection, and insertion of the overheads. The control unit 400, in turn, is coupled to receive the control information from a network management unit 2017 illustrated in FIGS. 11A and 11B. Specifically, the network management unit 2017 appropriately indicates to each ADM the types and locations to be inserted for overheads to be passed, so as to prevent conflicts or contradiction, thereby allowing overheads as well as main signals to be freely transmitted and received between multiplexers within the network.

As described above, according to the present invention, overheads can be passed through arbitrary multiplexers so that they may be used between arbitrary multiplexers likewise in the ADM described in the foregoing embodiment as well as in a transmission network or a transmission system which employs the ADMs. It is therefore possible to provide a transmission system which is free from a change in administration and maintenance operation capability due to a modification to a system configuration, i.e., which is superior in improved administration and maintenance operation capability, flexible, and highly usable.

Next explained in the following is a configuration for detecting transmission errors occurring in a transmission interval between multiplexers which transmits and receives overheads, with reference to another embodiment different in configuration from the foregoing embodiments. Specifically, this embodiment is equivalent to a configuration of a transmission system adopting SONET or SDH which notifies transmission errors occurring in an interval from an overhead transmitting multiplexer to an overhead receiving multiplexer using a tandem connection standardized by ANSI or ITU-T, i.e., a configuration which passes the B2 bytes through intervening multiplexers. Thus, in the aforementioned multiplexer and ADM, any configuration may be utilized.

Figure 12A:
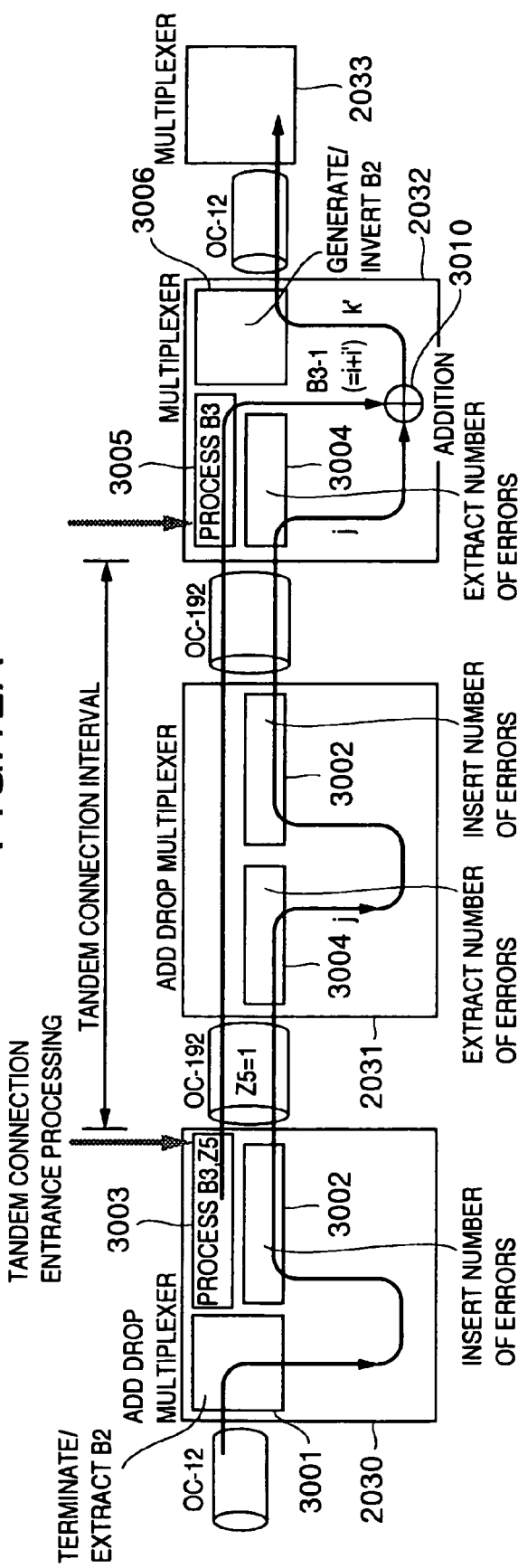
FIGS. 12A and 12B are operation explanation diagrams for explaining the configuration of transmission error detection using a tandem connection in a transmission network employing the transmission apparatuses according to the present invention.
Figure 12B:
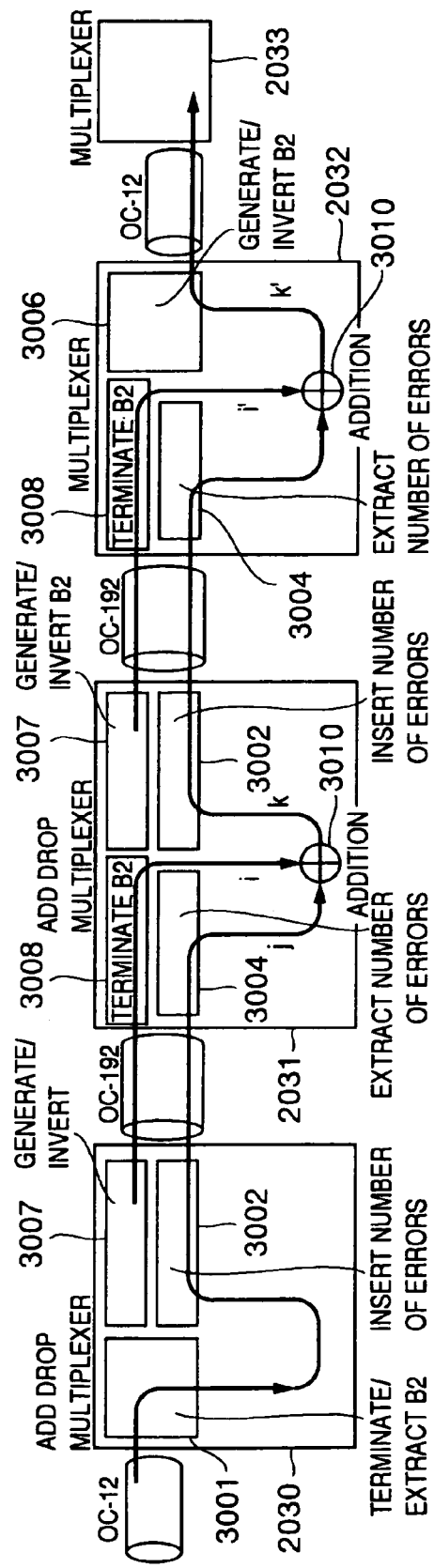
Figure 13:
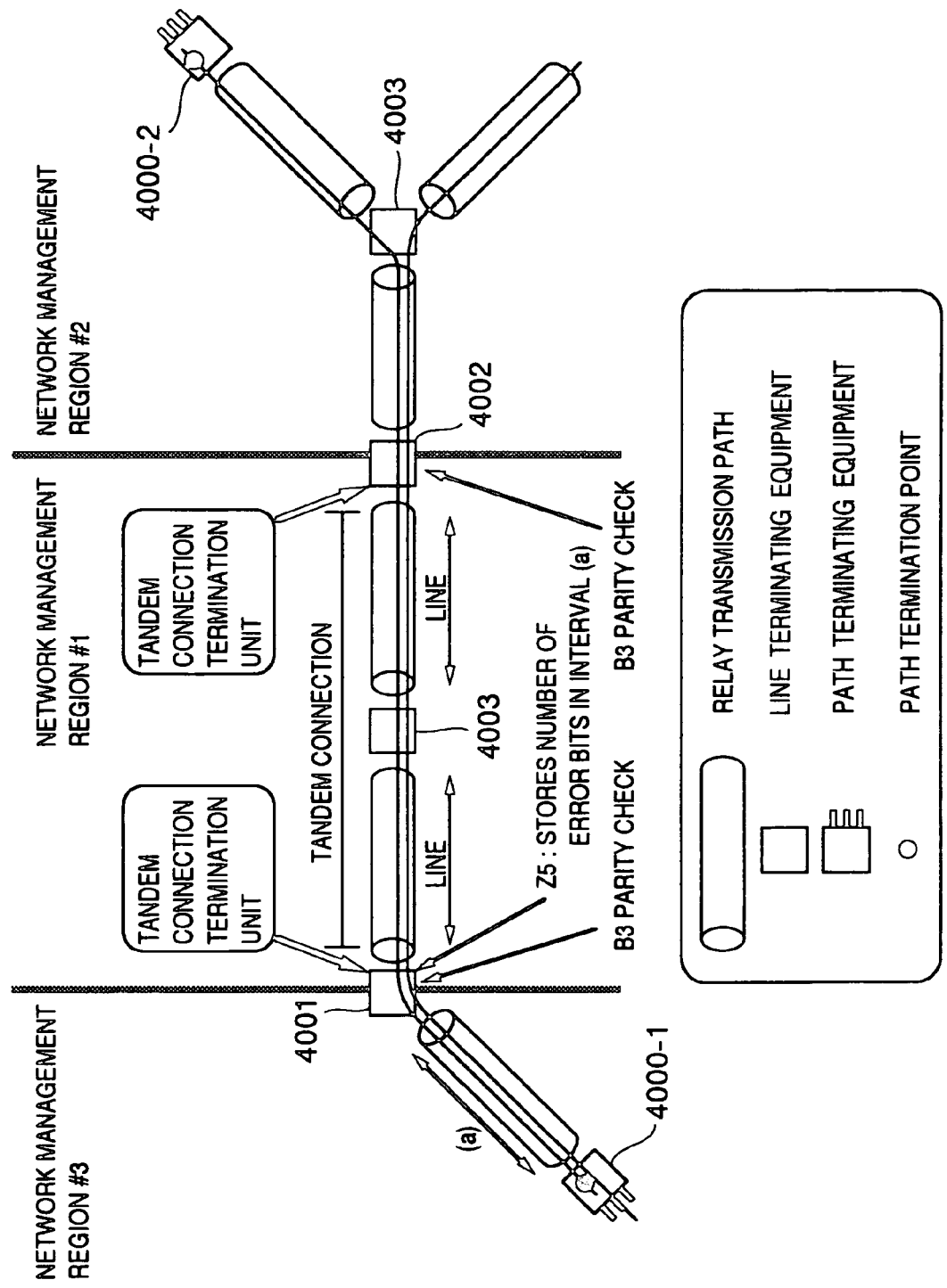
FIG. 13 is a network configuration diagram illustrating the configuration of a transmission network using a tandem connection employing the transmission apparatuses according to the present invention.

FIGS. 12A and 12B are operation explanation diagrams for explaining a configuration for detecting transmission errors using a tandem connection. More specifically, FIG. 12A illustrates the configuration according to this embodiment, and FIG. 12B illustrates the configuration for detecting transmission errors which has been explained in connection with the aforementioned multiplexer or ADM. FIG. 13 is a network configuration diagram illustrating the configuration of a transmission network using a tandem connection. With reference to these drawings, the configuration for detecting transmission errors using a tandem connection according to the present invention will be explained below in comparison with the embodiments described above.

As illustrated in FIG. 12B, the previously described embodiments are configured to pass the B2 bytes through a certain multiplexer such that errors are detected using the B2 bytes in a transmission interval between different multiplexers. For this purpose, each multiplexer which passes the B2 bytes terminates the B2 bytes, detects the number of errors i, adds the number of errors i to the number of errors j notified from a source multiplexer to derive a total number of errors k, and transmits the total number of errors k. Then, the last multiplexer which passes the overheads, generates B2 bytes from the final total number of errors (k' in FIG. 12B), which have been added in the respective intervening multiplexers, and inverts bits of the B2 bytes to notify transmission errors which have occurred during the transmission from an overhead originating multiplexer to a destination multiplexer.

In a transmission system adopting SONET or SDH, the management of a path is basically carried out between a source unit and a destination unit. However, if a path from a source Path Terminating Equipment (PTE) 4000-1 to a destination PTE 4000-2 passes through network regions which are managed by different management schemes as illustrated in FIG. 13 (in this embodiment, the path passes through network management regions 1-3), it is necessary to independently manage the path in each management region to locate a region in which a failure has occurred. Thus, as stipulated in ANSI standard T1. 150 or ITU-T standard G. 707, an interval between both boundaries of a management region including a plurality of continuously connected Line Terminating Equipments (LTEs) and lines is defined as a tandem connection for which a management method is defined. Specifically, one of a plurality of path overheads POHs included in a payload illustrated in the frame structure diagram of FIG. 1 is used. Transmission errors are managed using B3 byte in the third row for detecting errors in a path and Z5 byte in the ninth row which is a byte for managing a tandem connection. Explaining, as an example, the detection of transmission errors in the tandem connection in the management region 1, an LTE 4001 monitors the B3 byte for the number of errors l which have occurred on a path from the source PTE 4000-1 to the LTE 4001, and inserts the number of errors l into the Z5 byte and transmits the multiplexed signal to a LTE 4002. The LTE 4002 again monitors the B3 byte for the number of errors l' which have occurred on a path from the source PTE 4000-1 to the LTE 4002, and subtracts the number of errors l received through the Z5 byte from the number of errors l' to manage the number of errors which have occurred in the tandem connection.

In the configuration described in this embodiment for detecting transmission errors occurring in a transmission interval between multiplexers which transmits and receives overheads, the first multiplexer 2030 which first passes overheads in a tributary multiplexed signal is regarded as an entrance multiplexer of the tandem connection, and the last multiplexer 2032 which passes the overheads in the tributary multiplexed signal is regarded as a terminal multiplexer, as illustrated in FIG. 12A, so that the number of errors is communicated utilizing a tandem connection management method using the B3 byte and the Z5 byte as mentioned above.

Specifically, the multiplexer 2030 encodes the number of errors (j) detected after terminating the B2 bytes of the tributary multiplexed signal, inserts the encoded number of errors into a specified byte in an overhead area of a high speed multiplexed signal, and transmits the high speed multiplexed signal onto a transmission line to the destination multiplexer (3001, 3002), in a manner similar to the aforementioned embodiments. Also, the multiplexer 2030 checks the B3 byte for the number of errors which have occurred on a path up to the multiplexer 2030 itself, and inserts the detected number of errors (l) into the Z5 byte to transmit the number of errors (3003).

An intervening multiplexer 2031 which passes overheads therethrough only passes the received number of errors (3004, 3002), and does not add the number of errors (i), detected on a line between the multiplexers and notified through the B2 bytes, to the number of errors (l), as does the multiplexers of the aforementioned embodiment (see FIG. 12B). Of course, the termination of the B2 bytes (error detection on the reception side and generation of parities on the transmission side) is performed as usual (in conformity to the standard), which, however, is processed independently of the overhead passing processing explained in this embodiment. Also, since the B3 byte and the Z5 byte may be checked between paths, that is, on the root between the Path Terminating Equipments (PTEs) 4000-1 and 4000-2 of FIG. 13, the transmission apparatus of this embodiment does not require other processing (check for the number of errors) except for passing these bytes as the main signals.

The multiplexer 2032 extracts the number of errors (j) transmitted from the multiplexer 2030 (3004). Also, the B3 byte is checked as explained above, and the value of the received Z5 byte (l) is subtracted from the number of errors (l') occurring on the path up to the multiplexer 2032 to derive the number of transmission errors (l'-l, i.e., the number of errors equal to i+i' in FIG. 12B) which has occurred on a transmission path between the multiplexers 2030 and 2032 (tandem connection) (3005). Then, the received number of errors (j) and the calculation result (l'-l) are added to derive the number of errors (k') which have occurred on a transmission interval from the source multiplexer to the multiplexer 2032 in a manner similar to the aforementioned embodiment (3001), and the number of bits equal to k' in generated B2 parity bits are inverted and transmitted to a destination multiplexer 2033 (3006).

The configuration and method as described above also provide a result similar to the aforementioned embodiment in which the B2 bytes are passed through intervening multiplexers, thus making it possible to notify a destination apparatus of transmission errors which have occurred on a transmission interval between the source and destination multiplexers which transmit and receive the overheads. Also, according to the configuration described above, an intervening multiplex which passes overheads therethrough need not perform calculations. Since the first and last multiplexers are only required to perform calculations, the amount of hardware can be reduced in an interval including a large number of multiplexers which pass overheads therethrough. One of the aforementioned configuration (FIG. 12B) and the configuration of this embodiment (FIG. 12A) may be selected depending on the scale of a particular network or system.

As described above, since a transmission network is built with the multiplexers and ADMs provided with the function of passing overheads, in accordance with the present invention, a modification to the network configuration will not affect the administration and maintenance operation capability as has been often the case of the conventional transmission system. Also, since arbitrary overheads can be transmitted and received between arbitrary multiplexers within a transmission network, a flexible network having a superior administration and maintenance operation capability can be readily realized. Specifically, the orderwires E1, E2 may be transmitted and received between arbitrary multiplexers to allow a craft man to make a speech communication. In addition, the data communication channels D1-D12 may be transmitted and received to set a variety of parameters and so on for multiplexers, thus making it possible to build a flexible transmission network which can be readily modified in configuration. Particularly, in accordance with SONET, the D1-D12 are transmitted from a network management unit or the like to make settings for respective multiplexers, in which case if the configuration of passing such communication channels D1-D12 through intervening multiplexers is employed according to the present invention, data required for settings can be readily sent to a destination multiplexers without the need for the intervention of complicated processing performed by a control unit of a multiplexer, as is the case of the conventional multiplexers, each of which would have to once terminate and again transmit overheads. It is therefore appreciated that the present invention is extremely effective in the maintenance operation management of a transmission network. Further, since the switching control bytes K1, K2 for controlling the switching of transmission lines may be transmitted and received to achieve the selection of a transmission line free from contradiction between multiplexers, the network configuration can be promptly modified or reconfigured if a transmission line fails. This is also effective in the maintenance operation management for the transmission network. For transmission errors, although the B2 bytes cannot be directly transferred between source and destination multiplexers, the number of occurring errors is reliably detected and notified, so that it is possible to realize the management of the error ratio in a transmission interval equivalent to that achieved by the B2 bytes which are transmitted and received between directly coupled source and destination multiplexers without any intervening multiplexer. It will be of course appreciated that if other overheads illustrated in FIG. 3 are also transferred in a manner similar to the overheads explained above, they can be utilized likewise for the administration and maintenance operation between multiplexers.

In the present invention, undefined bytes in an overhead area of a multiplexed signal defined by the standard as mentioned above are selected, and overheads to be passed through a transmission apparatus are inserted into the selected undefined bytes in the multiplexed signal, and then transmitted in the multiplexed signal. In other words, in a transmission network or a transmission system, bytes to be used may be previously determined before transmission and reception, or the previously explained data communication channels may be used to modify settings of used bytes before transmitting and receiving these bytes. Since free settings can be made depending on the number of transmission apparatuses and the amount of administration and maintenance operation information within a transmission network as long as undefined bytes are available, it is possible to provide a transmission apparatus and a transmission network which have an administration and maintenance operation capability high enough to flexibly cope with modifications in network configuration or administration and maintenance operation method or with future modifications in the standards, if any.

According to the multiplex transmission apparatus and the multiplex transmission network of the present invention, desired transmission apparatuses within a network are allowed to transmit and receive overheads for carrying information associated with administration and maintenance operations, which have been terminated at each transmission apparatus in a conventional transmission system, so that it is possible to provide a transmission apparatus and a transmission network which have a high administration and maintenance operation capability independent of modifications in network configuration or of an employed administration and maintenance operation method.

What is claimed is:

1. An optical communication system for transmitting optical signals transmitted on a plurality of first optical transmission lines to a plurality of third optical transmission lines via a second optical transmission line, comprising:
a first optical transmission unit connected to said first and second optical transmission lines, for receiving first optical signals transmitted on said first optical transmission lines and transmitting a second optical signal obtained from said first optical signals to said second optical transmission lines; and
a second optical transmission unit connected to said second and third optical transmission lines, for receiving said second optical signal from said second optical transmission line and transmitting third optical signals obtained from said second optical signal to said third optical transmission lines,
wherein said first optical transmission unit extracts optional information included in first regions of a plurality of first overheads of said first optical signals and enters said optional information extracted into a second region which is not defined for a particular use in a second overhead of said second optical signal and transmits said second optical signal comprising said optional information in said second overhead to said second transmission lines; and
said second optical transmission unit extracts said optional information in said second overhead of said second optical signal and enters said optional information extracted into third regions of a plurality of overheads of third optical signals and transmits said third optical signals comprising said plurality of optional information in said third overheads to said third transmission lines,
wherein said first regions are predetermined for storing said optional information in said first overheads, and said third regions are predetermined for storing said optional information in said third overheads.

2. The optical communication system according to claim 1, wherein said second optical transmission line transmits said second optical signal faster than said first and third optical transmission lines, and said first optical transmission unit multiplexes said first optical signals to obtain said second optical signal, and said second optical transmission unit demultiplexes said second optical signal to obtain said third optical signals.

3. The optical communication system according to claim 2, wherein said first optical transmission unit multiplexes said optional information and enters said optional information multiplexed into said region which is not occupied for use in said second overhead of said second optical signal multiplexed, and said second optical transmission unit demultiplexes said optional information multiplexed and enters said optional information demultiplexed into said plurality of said regions allotted for said optional information in said plurality of third overheads of said third optical signals demultiplexed.

4. The optical communication system according to claim 1, further comprising:
a system management unit connected to said first and second optical transmission units, for indicating said optional information to be extracted and said region which is not occupied for use in said second overhead to said first and second optical transmission units.

5. The optical communication system according to claim 1, wherein said first overheads and said third overheads have the same format, and said first regions and said third regions are the same regions of said first and third overheads, respectively.

6. An optical communication system for transmitting optical signals transmitted on a plurality of first optical transmission lines to a plurality of third optical transmission lines via at least one second optical transmission lines, comprising:
a first optical transmission unit connected to said first and second optical transmission lines; and
a second optical transmission unit connected to said second and third optical transmission lines;
wherein said first optical transmission unit extracts first information concerning a number of errors included in first regions of a plurality of first overheads of first optical signals received from said first optical transmission lines and adds a number of errors detected from first optical signals to said number of errors of said first information to obtain second information concerning a number of errors and enters said second information into a second region which is not defined for a particular use in a second overhead of a second optical signal and transmits said second optical signal comprising said second information in said second overhead to said second optical transmission line, and
said second optical transmission unit extracts said second information in said second overhead of said second optical signal received from said second optical transmission line and adds a number of errors of said second information to obtain third information concerning a number of errors, and enters said third information into third regions of a plurality of third overheads of third optical signals and transmits said third optical signals comprising said third information in said third overheads to said third transmission lines, wherein said first regions are predetermined for storing said optional information in said first overheads, and said third regions are predetermined for storing said optional information in said third overheads.

7. The optical communication system according to claim 6, wherein said second optical transmission line transmits said second optical signal faster than said first and third optical transmission lines, and said first optical transmission unit multiplexes said first optical signals to obtain said second optical signal, and said second optical transmission unit demultiplexes said second optical signal to obtain said third optical signals.

8. The optical communication system according to claim 7, wherein said first optical transmission unit multiplexes said first information to obtain said second information and enters said second information multiplexed into said region which is not occupied for use in said second overhead of said second optical signal multiplexed, and said second optical transmission unit demultiplexes said second information multiplexed to obtain said third information and enters said third information demultiplexed into said plurality of regions allotted for said third information in said plurality of third overheads of said third optical signals demultiplexed.

9. The optical communication system according to claim 6, further comprising:
a system management unit connected to said first and second optical transmission units, for indicating information concerning a number of errors and said region which is not occupied for use in said second overhead to said first and second optical transmission units.

10. The optical communication system according to claim 6, wherein said first overheads and said third overheads have the same format, and said first regions and said third regions are the same regions of said first and third overheads, respectively.

11. An optical communication system for transmitting optical signals transmitted on a plurality of first optical transmission lines to a plurality of third optical transmission lines via at least one second optical transmission line, comprising:
a first optical transmission unit comprising:
a plurality of first optical signal receiving portions connected to each of said first optical transmission lines, for receiving a plurality of first optical signals from said first optical transmission lines and extracting specified information included in first regions of a plurality of first overheads of said first optical signals;
a first overhead processing portion connected to said plurality of first optical signal receiving portions, for arranging said specified information extracted; and
a first optical signal transmission portion connected to said first overhead processing portion, for entering said specified information arranged by said first overhead processing portion into a second region which is not defined for a particular use in a second overhead of a second optical signal and for transmitting said second optical signal comprising said specified information in said second overhead to said second optical transmission lines,
and
a second optical transmission unit comprising:
a second optical signal receiving portion connected to said second optical transmission line, for receiving said second optical signal from said second optical transmission line and extracting said specified information in said second overhead;
a second overhead processing portion connected to said second optical signal receiving portion, for arranging said specified information extracted; and
a plurality of second optical signal transmission portions connected to said second overhead processing portion, for entering said specified information arranged by said second overhead processing portion into third regions of a plurality of third overheads of a plurality of third optical signals for transmitting said third optical signals comprising said specified information in said third overheads to said third optical transmission lines,
wherein said first regions are predetermined for storing said optional information in said first overheads, and said third regions are predetermined for storing said optional information in said third overheads.

12. The optical transmission system according to claim 11, wherein said first overhead processing portion arranges said specified information according to kinds of information, said second overhead processing portion arranges said specified information so that said specified information are entered into said regions allotted for said specified information of said third overheads.

13. The optical transmission system according to claim 11, wherein said first optical signal transmission unit comprises a first control portion for indicating said specified information to be extracted to said first optical signal receiving portions, indicating a method of arranging said specified information to said first overhead processing portion and indicating said region which is not occupied for use in said second overhead to said first optical signal transmission portion, and
said second optical signal transmission unit comprises a second control portion for indicating said region which is not occupied for use of said second overhead to said second optical signal receiving portion and a method of arranging said specified information to said second overhead processing portion.

14. The optical transmission system according to claim 13, further comprising a system management unit connected to said first and second optical signal transmission units, for indicating said specified information to be extracted and said region which is not occupied for use in said second overhead to said first and second control portions.

15. The optical communication system according to claim 11, wherein said first overheads and said third overheads have the same format, and said first regions and said third regions are the same regions of said first and third overheads, respectively.

* * * * *